US012001958B2

United States Patent
Kamenev et al.

(10) Patent No.: US 12,001,958 B2
(45) Date of Patent: Jun. 4, 2024

(54) FUTURE TRAJECTORY PREDICTIONS IN MULTI-ACTOR ENVIRONMENTS FOR AUTONOMOUS MACHINE

(71) Applicant: NVIDIA Corporation, Santa Clara, CA (US)

(72) Inventors: Alexey Kamenev, Bellevue, WA (US); Nikolai Smolyanskiy, Seattle, WA (US); Ishwar Kulkarni, San Jose, CA (US); Ollin Boer Bohan, Redmond, WA (US); Fangkai Yang, Seattle, WA (US); Alperen Degirmenci, Matawan, NJ (US); Ruchi Bhargava, Redmond, WA (US); Urs Muller, Keyport, NJ (US); David Nister, Bellevue, WA (US); Rotem Aviv, San Diego, CA (US)

(73) Assignee: NVIDIA Corporation, Santa Clara, CA (US)

( * ) Notice: Subject to any disclaimer, the term of this patent is extended or adjusted under 35 U.S.C. 154(b) by 657 days.

(21) Appl. No.: 16/824,199

(22) Filed: Mar. 19, 2020

(65) Prior Publication Data

US 2021/0295171 A1 Sep. 23, 2021

(51) Int. Cl.
*G06N 3/088* (2023.01)
*G06N 3/044* (2023.01)
*G06N 3/045* (2023.01)

(52) U.S. Cl.
CPC .......... *G06N 3/088* (2013.01); *G06N 3/044* (2023.01); *G06N 3/045* (2023.01)

(58) Field of Classification Search
CPC .... G06N 3/088; G06N 3/0445; G06N 3/0454; G06N 3/045; G06N 3/044
See application file for complete search history.

(56) References Cited

U.S. PATENT DOCUMENTS

| 6,011,494 A * | 1/2000 | Watanabe | G01C 21/3635 340/995.14 |
| 6,253,150 B1 * | 6/2001 | Nakamura | G01C 21/26 340/901 |

(Continued)

FOREIGN PATENT DOCUMENTS

WO 2016/156236 A1 10/2016

OTHER PUBLICATIONS

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

(Continued)

*Primary Examiner* — Charles L Beard
(74) *Attorney, Agent, or Firm* — Taylor English Duma L.L.P.

(57) ABSTRACT

In various examples, past location information corresponding to actors in an environment and map information may be applied to a deep neural network (DNN)—such as a recurrent neural network (RNN)—trained to compute information corresponding to future trajectories of the actors. The output of the DNN may include, for each future time slice the DNN is trained to predict, a confidence map representing a confidence for each pixel that an actor is present and a vector field representing locations of actors in confidence maps for prior time slices. The vector fields may thus be used to track an object through confidence maps for each future time slice to generate a predicted future trajectory for each actor. The predicted future trajectories, in addition to tracked past trajectories, may be used to generate full trajectories for the actors that may aid an ego-vehicle in navigating the environment.

29 Claims, 15 Drawing Sheets

(56) References Cited

U.S. PATENT DOCUMENTS

| | | | |
|---|---|---|---|
| 7,426,437 B2* | 9/2008 | Breed | G01S 19/42 |
| | | | 340/995.12 |
| 8,775,341 B1* | 7/2014 | Commons | G06F 16/3344 |
| | | | 706/20 |
| 9,015,093 B1* | 4/2015 | Commons | G01C 21/3602 |
| | | | 706/26 |
| 10,885,698 B2 | 1/2021 | Muthler et al. | |
| 10,950,036 B2* | 3/2021 | Ha | G06T 15/50 |
| 11,055,624 B1* | 7/2021 | Sapp | G06N 7/01 |
| 11,126,180 B1* | 9/2021 | Kobilarov | G05B 13/0265 |
| 11,157,010 B1* | 10/2021 | Narang | G05D 1/0219 |
| 11,195,418 B1* | 12/2021 | Hong | B60W 30/18159 |
| 11,365,976 B2* | 6/2022 | Colgate | G01C 21/3889 |
| 11,399,198 B1* | 7/2022 | Pourreza | H04N 19/513 |
| 11,410,015 B1* | 8/2022 | Naumov | G06N 7/01 |
| 11,537,134 B1* | 12/2022 | Wiest | G06N 3/0455 |
| 11,548,528 B2* | 1/2023 | Fedorov | B60W 60/00272 |
| 11,554,785 B2* | 1/2023 | Siddiqui | G06N 3/08 |
| 11,555,706 B1* | 1/2023 | Levihn | G05D 1/0088 |
| 11,565,709 B1* | 1/2023 | Caldwell | G06N 3/088 |
| 11,636,649 B2* | 4/2023 | Lieb | G06T 7/35 |
| | | | 345/424 |
| 11,760,388 B2* | 9/2023 | Savtchenko | B60W 40/04 |
| | | | 701/23 |
| 11,782,158 B2* | 10/2023 | Lee | G06N 7/01 |
| | | | 356/28.5 |
| 11,816,793 B2* | 11/2023 | Lieb | G06N 3/08 |
| 11,858,514 B2* | 1/2024 | Bagschik | G06N 3/088 |
| 2005/0027434 A1* | 2/2005 | Hirose | G08G 1/096827 |
| | | | 340/995.13 |
| 2005/0027437 A1* | 2/2005 | Takenaga | G01C 21/3691 |
| | | | 455/414.3 |
| 2005/0027447 A1* | 2/2005 | Hirose | G08G 1/0969 |
| | | | 701/423 |
| 2005/0027448 A1* | 2/2005 | Takenaga | G08G 1/09675 |
| | | | 340/995.13 |
| 2005/0060069 A1* | 3/2005 | Breed | G08G 1/166 |
| | | | 701/408 |
| 2005/0071081 A1* | 3/2005 | Hirose | G01C 21/20 |
| | | | 340/995.13 |
| 2005/0090974 A1* | 4/2005 | Hirose | G01C 21/3691 |
| | | | 340/995.13 |
| 2005/0096839 A1* | 5/2005 | Nakano | G08G 1/0969 |
| | | | 340/995.13 |
| 2006/0284880 A1* | 12/2006 | Zhou | G06T 15/04 |
| | | | 345/582 |
| 2007/0273555 A1* | 11/2007 | Amano | G08G 1/0969 |
| | | | 340/935 |
| 2008/0167821 A1* | 7/2008 | Breed | G08G 1/161 |
| | | | 701/301 |
| 2010/0007523 A1* | 1/2010 | Hatav | G01C 21/3697 |
| | | | 340/901 |
| 2013/0204460 A1* | 8/2013 | Uno | B60W 30/18154 |
| | | | 701/1 |
| 2014/0267346 A1* | 9/2014 | Ren | G06T 15/04 |
| | | | 345/582 |
| 2015/0243166 A1* | 8/2015 | Yoshioka | G01C 21/3691 |
| | | | 701/117 |
| 2015/0344030 A1* | 12/2015 | Damerow | G06V 20/588 |
| | | | 701/1 |
| 2016/0075330 A1* | 3/2016 | Oguri | B60T 7/12 |
| | | | 701/70 |
| 2016/0078339 A1* | 3/2016 | Li | G06N 3/045 |
| | | | 706/20 |
| 2017/0132830 A1* | 5/2017 | Ha | G06T 15/55 |
| 2017/0221366 A1* | 8/2017 | An | G08G 1/096758 |
| 2017/0227765 A1* | 8/2017 | Mammou | H04L 65/80 |
| 2017/0263047 A1* | 9/2017 | Mima | G06T 15/60 |
| 2017/0278293 A1* | 9/2017 | Hsu | G06T 11/001 |
| 2017/0337726 A1* | 11/2017 | Bui | G06T 15/04 |
| 2018/0012082 A1* | 1/2018 | Satazoda | G06V 10/763 |
| 2018/0032840 A1* | 2/2018 | Yu | G06V 10/774 |
| 2018/0112997 A1* | 4/2018 | Fasola | B60W 60/0011 |
| 2018/0120843 A1* | 5/2018 | Berntorp | G06N 3/08 |
| 2018/0124423 A1* | 5/2018 | Choi | G06V 10/82 |
| 2018/0143644 A1* | 5/2018 | Li | G06V 40/107 |
| 2018/0144535 A1* | 5/2018 | Ford | G06T 15/005 |
| 2018/0307790 A1* | 10/2018 | Chuang | G06N 3/08 |
| 2018/0364703 A1* | 12/2018 | Liu | G05D 1/0088 |
| 2019/0033085 A1* | 1/2019 | Ogale | G01C 21/3446 |
| 2019/0034794 A1* | 1/2019 | Ogale | G06N 3/084 |
| 2019/0049970 A1* | 2/2019 | Djuric | G05D 1/0088 |
| 2019/0064801 A1* | 2/2019 | Frazzoli | B60W 30/182 |
| 2019/0072965 A1* | 3/2019 | Zhang | G08G 1/167 |
| 2019/0072966 A1* | 3/2019 | Zhang | G05D 1/228 |
| 2019/0072973 A1* | 3/2019 | Sun | G05D 1/0221 |
| 2019/0196481 A1* | 6/2019 | Tay | G05D 1/0246 |
| 2019/0212749 A1* | 7/2019 | Chen | B60W 30/00 |
| 2019/0213426 A1* | 7/2019 | Chen | G06T 7/20 |
| 2019/0251360 A1* | 8/2019 | Cricri | G06V 10/82 |
| 2019/0258251 A1* | 8/2019 | Ditty | G05D 1/0248 |
| 2019/0266418 A1* | 8/2019 | Xu | G06V 10/764 |
| 2019/0295282 A1* | 9/2019 | Smolyanskiy | G06F 18/22 |
| 2019/0297326 A1* | 9/2019 | Reda | H04N 19/172 |
| 2019/0382007 A1* | 12/2019 | Casas | G06V 10/82 |
| 2019/0384303 A1* | 12/2019 | Muller | G06N 20/00 |
| 2019/0384304 A1* | 12/2019 | Towal | G05D 1/0221 |
| 2020/0025935 A1* | 1/2020 | Liang | G06V 10/764 |
| 2020/0042799 A1* | 2/2020 | Huang | G06V 10/764 |
| 2020/0055515 A1* | 2/2020 | Herman | G06N 3/047 |
| 2020/0058156 A1* | 2/2020 | Tran | G06N 3/045 |
| 2020/0074266 A1* | 3/2020 | Peake | G06T 7/246 |
| 2020/0082248 A1* | 3/2020 | Villegas | G06N 3/044 |
| 2020/0086858 A1* | 3/2020 | Yao | G06T 7/246 |
| 2020/0110416 A1* | 4/2020 | Hong | G05D 1/0221 |
| 2020/0135017 A1* | 4/2020 | Ma | G08G 1/0141 |
| 2020/0160697 A1* | 5/2020 | Hayashi | G06F 16/29 |
| 2020/0174481 A1* | 6/2020 | Van Heukelom | G06N 3/045 |
| 2020/0174490 A1* | 6/2020 | Ogale | G06N 3/084 |
| 2020/0193623 A1* | 6/2020 | Liu | G06N 3/04 |
| 2020/0209860 A1* | 7/2020 | Zhang | G05D 1/0231 |
| 2020/0211375 A1* | 7/2020 | Vig | G08G 1/09626 |
| 2020/0218979 A1* | 7/2020 | Kwon | G06F 18/2155 |
| 2020/0225669 A1* | 7/2020 | Silva | B60W 60/0011 |
| 2020/0271454 A1* | 8/2020 | Kato | G09B 29/106 |
| 2020/0298891 A1* | 9/2020 | Liang | G06V 10/82 |
| 2020/0302662 A1* | 9/2020 | Homayounfar | G06V 10/454 |
| 2020/0309541 A1* | 10/2020 | Lavy | G06V 20/588 |
| 2020/0324761 A1* | 10/2020 | Magzimof | G08G 1/166 |
| 2020/0331465 A1* | 10/2020 | Herman | G05D 1/0276 |
| 2020/0351489 A1* | 11/2020 | Watson | G06T 7/85 |
| 2020/0356827 A1* | 11/2020 | Dinerstein | G06F 18/213 |
| 2020/0364901 A1* | 11/2020 | Choudhuri | G06T 19/006 |
| 2020/0379461 A1* | 12/2020 | Singh | G06N 3/088 |
| 2021/0004012 A1* | 1/2021 | Marchetti-Bowick | |
| | | | B60W 30/18154 |
| 2021/0004611 A1* | 1/2021 | Garimella | G06T 11/60 |
| 2021/0009163 A1* | 1/2021 | Urtasun | G08G 1/20 |
| 2021/0009166 A1* | 1/2021 | Li | G06F 16/909 |
| 2021/0073997 A1* | 3/2021 | Vora | G06V 20/49 |
| 2021/0078594 A1* | 3/2021 | Bansal | G06F 18/213 |
| 2021/0082283 A1* | 3/2021 | Malla | G06V 20/58 |
| 2021/0118288 A1* | 4/2021 | Kalabic | H04W 4/44 |
| 2021/0132619 A1* | 5/2021 | Refaat | G06N 20/20 |
| 2021/0146959 A1* | 5/2021 | Manivasagam | G06N 3/044 |
| 2021/0146963 A1* | 5/2021 | Li | G06N 20/00 |
| 2021/0149404 A1* | 5/2021 | Zeng | G01S 17/89 |
| 2021/0150895 A1* | 5/2021 | Huang | G06V 20/56 |
| 2021/0152997 A1* | 5/2021 | Manivasagam | H04W 4/46 |
| 2021/0156704 A1* | 5/2021 | Gibson | G06V 10/25 |
| 2021/0157325 A1* | 5/2021 | Beller | B60W 60/001 |
| 2021/0174524 A1* | 6/2021 | Wang | G06N 3/084 |
| 2021/0181754 A1* | 6/2021 | Cui | G06N 3/084 |
| 2021/0192748 A1* | 6/2021 | Morales Morales | |
| | | | G05D 1/0221 |
| 2021/0201504 A1* | 7/2021 | Xu | G06N 3/08 |
| 2021/0209785 A1* | 7/2021 | Unnikrishnan | G01S 7/41 |
| 2021/0209797 A1* | 7/2021 | Lee | G06T 17/00 |
| 2021/0233265 A1* | 7/2021 | Angelova | G06N 3/044 |
| 2021/0233391 A1* | 7/2021 | Xu | G01C 21/3691 |
| 2021/0247196 A1* | 8/2021 | Wells | G06Q 10/02 |
| 2021/0278539 A1* | 9/2021 | Laddha | G01S 17/42 |

(56) References Cited

U.S. PATENT DOCUMENTS

| | | | |
|---|---|---|---|
| 2021/0300422 A1* | 9/2021 | McGill | B60W 60/0016 |
| 2021/0318140 A1* | 10/2021 | Tang | G01C 21/3896 |
| 2021/0327113 A1* | 10/2021 | Urban | G06T 11/60 |
| 2021/0357688 A1* | 11/2021 | Kearney | G06F 18/214 |
| 2021/0358123 A1* | 11/2021 | Kearney | G16H 30/40 |
| 2021/0365736 A1* | 11/2021 | Kearney | A61B 6/5294 |
| 2021/0380143 A1* | 12/2021 | Alvarez | B60W 50/14 |
| 2021/0390414 A1* | 12/2021 | Schneider | G06N 5/046 |
| 2021/0397966 A1* | 12/2021 | Sun | G06T 7/10 |
| 2021/0403036 A1* | 12/2021 | Danna | G06F 16/2457 |
| 2021/0406262 A1* | 12/2021 | Unnikrishnan | G06F 16/248 |
| 2021/0406559 A1* | 12/2021 | Efland | G06V 10/803 |
| 2021/0406679 A1* | 12/2021 | Wen | G06V 20/56 |
| 2022/0001872 A1* | 1/2022 | Taieb | G01C 21/20 |
| 2022/0012466 A1* | 1/2022 | Taghavi | G06V 20/56 |
| 2022/0012815 A1* | 1/2022 | Kearney | G16H 50/70 |
| 2022/0017115 A1* | 1/2022 | Biala | G01C 21/3407 |
| 2022/0035346 A1* | 2/2022 | Mercangoez | G06N 3/045 |
| 2022/0035376 A1* | 2/2022 | Laddah | G05D 1/0221 |
| 2022/0048503 A1* | 2/2022 | Khandelwal | G06V 20/56 |
| 2022/0058420 A1* | 2/2022 | Peng | G06V 10/82 |
| 2022/0089183 A1* | 3/2022 | Hwu | G06N 3/088 |
| 2022/0101225 A1* | 3/2022 | Zhou | G06Q 10/06312 |
| 2022/0101600 A1* | 3/2022 | Urtasun | G06T 17/10 |
| 2022/0108213 A1* | 4/2022 | Cao | G06N 3/045 |
| 2022/0128377 A1* | 4/2022 | Fujita | G01C 21/3415 |
| 2022/0138568 A1* | 5/2022 | Smolyanskiy | G06N 3/044 706/21 |
| 2022/0153314 A1* | 5/2022 | Suo | B60W 60/00276 |
| 2022/0156939 A1* | 5/2022 | Homayounfar | G06V 10/945 |
| 2022/0157161 A1* | 5/2022 | Tan | G08G 1/0129 |
| 2022/0164595 A1* | 5/2022 | Zhou | G06V 10/757 |
| 2022/0180106 A1* | 6/2022 | Voodarla | G06N 3/08 |
| 2022/0180643 A1* | 6/2022 | Retterath | G06V 10/761 |
| 2022/0201555 A1* | 6/2022 | Zeng | H04W 88/16 |
| 2022/0214457 A1* | 7/2022 | Liang | G06N 3/04 |
| 2022/0214663 A1* | 7/2022 | Fadaie | G05B 19/4155 |
| 2022/0219716 A1* | 7/2022 | McAlister | B60W 50/14 |
| 2022/0250619 A1* | 8/2022 | Ikeda | B60W 30/12 |
| 2022/0291742 A1* | 9/2022 | Otsuka | G06F 3/012 |
| 2022/0300748 A1* | 9/2022 | Tokmakov | G06V 20/56 |
| 2022/0301193 A1* | 9/2022 | Ichihashi | G06T 5/50 |
| 2022/0306152 A1* | 9/2022 | Zhang | B60W 30/18159 |
| 2022/0363247 A1* | 11/2022 | Hendy | B60W 10/20 |
| 2022/0368945 A1* | 11/2022 | Otsuka | H04N 21/816 |
| 2022/0391639 A1* | 12/2022 | Gurumurthy | G06T 15/005 |
| 2022/0402485 A1* | 12/2022 | Kobilarov | B60W 30/0956 |
| 2023/0050217 A1* | 2/2023 | Clark | G05B 13/048 |
| 2023/0057118 A1* | 2/2023 | Bankiti | G06V 30/274 |
| 2023/0120172 A1* | 4/2023 | Yoshimatsu | B60W 60/00 701/301 |
| 2023/0137263 A1* | 5/2023 | Keski-Valkama | G01C 21/3819 701/117 |
| 2023/0169674 A1* | 6/2023 | Sakurai | G06V 10/764 382/103 |
| 2023/0186587 A1* | 6/2023 | Shrivastava | G06T 7/20 382/100 |
| 2023/0196690 A1* | 6/2023 | Watson | G06V 10/771 345/633 |
| 2023/0242107 A1* | 8/2023 | Noma | B60W 30/0956 701/23 |
| 2023/0252796 A1* | 8/2023 | Bao | G06V 10/454 382/103 |
| 2023/0260266 A1* | 8/2023 | Karasev | G06V 10/82 382/104 |
| 2023/0281830 A1* | 9/2023 | Zhang | G06T 3/4069 382/173 |
| 2023/0296758 A1* | 9/2023 | Akbarzadeh | G01S 17/89 382/103 |

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Search Report and Written Opinion received for PCT Application PCT/US2021/072157, dated Feb. 22, 2022, 18 pages.

Bansal, Mayank, Alex Krizhevsky, and Abhijit Ogale. "Chauffeurnet: Learning to drive by imitating the best and synthesizing the worst." arXiv preprint arXiv:1812.03079 (2018). 20 Pages.

Lee, Namhoon, et al. "Desire: Distant future prediction in dynamic scenes with interacting agents." Proceedings of the IEEE Conference on Computer Vision and Pattern Recognition. 2017. 10 pages.

Chai, Yuning, et al. "Multipath: Multiple probabilistic anchor trajectory hypotheses for behavior prediction." arXiv preprint arXiv:1910.05449 (2019). 14 pages.

Henaff, Mikael, Alfredo Canziani, and Yann LeCun. "Model-predictive policy learning with uncertainty regularization for driving in dense traffic." arXiv preprint arXiv:1901.02705 (2019). 20 pages.

Styles, O., et al., "Multiple Object Forecasting: Predicting Future Object Locations in Diverse Environments", IEEE Winter Conference on Applications of Computer Vision, pp. 679-688 (2020).

International Search Report and Written Opinion received for PCT Patent Application No. PCT/US2021/023338, dated Jun. 9, 2021, 16 pages.

"Taxonomy and Definitions for Terms Related to Driving Automation Systems for On-Road Motor Vehicles," Standard No. J3016-201609, published on Sep. 30, 2016, pp. 30.

"Taxonomy and Definitions for Terms Related to Driving Automation Systems for On-Road Motor Vehicles," Standard No. J3016-201806, published on Jun. 15, 2018, pp. 35.

Bansal, M., et al., , "ChauffeurNet: Learning to drive by imitating the best and synthesizing the worst," in Robotics Science and Systems (RSS), pp. 10 (2019).

Bergamini, L., et al., "SimNet: Learning reactive self-driving simulations from real-world observations," in 2021 International Conference on Robotics and Automation (ICRA2021), pp. 7 (2021).

Brockman, G., et al., "OpenAI gym," Machine Learning, arXiv preprint arXiv:1606.01540, pp. 4 (2016).

Buehler, M., et al., "The DARPA Urban Challenge: Autonomous Vehicles in City Traffic," Springer Tracts in Advanced Robotics, vol. 56, pp. 651 (2009).

Casas, S., et al., "Implicit latent variable model for scene-consistent motion forecasting, " European Conference on Computer Vision (ECCV), pp. 44 (2020).

Chen, J., et al., "Model-free deep reinforcement learning for urban autonomous driving," in IEEE Intelligent Transportation Systems Conference (ITSC), pp. 2765-2771 (2019).

Chen, L., et al., "DeepLab: Semantic image segmentation with deep convolutional nets, atrous convolution, and fully connected crfs," IEEE Transactions on Pattern Analysis and Machine Intelligence (PAMI), vol. 40, No. 4, pp. 834-848 (2018).

Codevilla, F., et al., "End-to-end driving via conditional imitation learning," in IEEE International Conference on Robotics and Automation (ICRA), pp. 4693-4700 (2018).

Djuric, N., et al., "Multixnet: Multiclass multistage multimodal motion prediction," arXiv preprint arXiv:2006.02000, Computer Vision and Pattern Recognition, pp. 8 (2020).

Dosovitskiy, A., et al., "CARLA: An open urban driving simulator," in Conference on robot learning (CoRL), pp. 16 (2017).

Fan, H., et al., "Baidu Apollo EM motion planner," in arXiv:1807.08048, pp. 15 (2018).

Gao, J., et al., "VectorNet: Encoding HD maps and agent dynamics from vectorized representation," in Proceedings of the IEEE/CVF Conference on Computer Vision and Pattern Recognition (CVPR), pp. 9 (2020).

(56) References Cited

OTHER PUBLICATIONS

Zhao, H., et al., "TNT: target-driven trajectory prediction," in arXiv:2008.08294, pp. 12 (2020).

Haarnoja, T., et al., "Soft actor-critic: Off-policy maximum entropy deep reinforcement learning with a stochastic actor," in International Conference on Machine Learning (ICML), pp. 1861-1870 (2018).

Hernandez-Leal, P., et al., "Agent modeling as auxiliary task for deep reinforcement learning," in Proceedings of the AAAI Conference on Artificial Intelligence and Interactive Digital Entertainment, vol. 15, No. 1, pp. 31-37 (2019).

Kingma, D. P., and Welling, M., "Auto-encoding variational bayes," Machine Learning, arXiv preprint arXiv:1312.6114, pp. 14 (2013).

Kiran, B.R., et al., "Deep reinforcement learning for autonomous driving: A survey," IEEE Transactions on Intelligent Transportation Systems, pp. 1-18 (2021).

Lavalle, S. M., "Planning algorithms," Cambridge University Press, pp. 512 (2006).

Lillicrap, T. P., et al., "Continuous control with deep reinforcement learning," in ICLR, pp. 14 (2015).

Lin, T.-Y., et al., "Focal loss for dense object detection," in ICCV, pp. 2980-2988 (2017).

Lopez, P.A., et al., "Microscopic traffic simulation using sumo," The 21st IEEE in International Conference on Intelligent Transportation Systems (ITSC), pp. 2575-2582 (2018).

Mo, X., et al., "ReCoG: A deep learning framework with heterogeneous graph for interaction-aware trajectory prediction," in arXiv:2012.05032, pp. 10 (2021).

Pomerleau, D.A., "Alvinn: An autonomous land vehicle in a neural network," in Proceedings of Neural Information Processing Systems (NeurIPS), pp. 305-313 (1989).

Ratliff, N. D., et al., , "Maximum margin planning," in Proceedings of the 23rd International Conference on Machine Learning (ICML), pp. 729-736 (2006).

Rhinehart, N., et al., "Precog: Prediction conditioned on goals in visual multi-agent settings," In Proceedings of the IEEE/CVF International Conference on Computer Vision (ICCV), pp. 2821-2830 (2019).

Ross, S., et al., "A reduction of imitation learning and structured prediction to No. regret online learning," in Proceedings of the Fourteenth International Conference on Artificial Intelligence and Statistics, pp. 627-635 (2011).

Sadat, A., et al., "Jointly learnable behavior and trajectory planning for self-driving vehicles," in IEEE/RSJ International Conference on Intelligent Robots and Systems (IROS), pp. 3949-3956 (2019).

Salzmann, T., et al., "Trajectron++: Dynamically-feasible trajectory forecasting with heterogeneous data," European Conference on Computer Vision (ECCV) 2020, pp. 683-700 (2020).

Saxena, D. M., et al., "Driving in dense traffic with model-free reinforcement learning," in IEEE International Conference on Robotics and Automation (ICRA), pp. 5385-5392 (2020).

Scibior, A., et al., "Imagining the road ahead: Multi-agent trajectory prediction via differentiable simulation," in IEEE International Conference on Intelligent Transportation Systems (ITSC), pp. 10 (2021).

Shalev-Shwartz, S., et al., "Safe, multi-agent, reinforcement learning for autonomous driving," in NeurIPS workshop, pp. 1-13 (2016).

Suo, S., et al., "TrafficSim: Learning to simulate realistic multi-agent behaviors," in Proceedings of the IEEE/CVF Conference on Computer Vision and Pattern Recognition (CVPR), pp. 10400-10409 (2021).

Button, R. S., and Barto, A. G., "Reinforcement Learning: An Introduction," 2nd ed. The MIT Press, pp. 548 (2018).

Wolf, P., et al., "Learning how to drive in a real world simulation with deep q-networks," in IEEE Intelligent Vehicles Symposium (IV), pp. 244-250 (2017).

Wu, Z., et al., "A comprehensive survey on graph neural networks," IEEE transactions on neural networks and learning systems, vol. 32, No. 1, pp. 4-22 (2020).

Yoshida, W., et al., "Game theory of mind," PLoS computational biology, vol. 4, No. 12, pp. 14 (2008).

Zeng, W., et al., "End-to-end interpretable neural motion planner," in Proceedings of the IEEE/CVF Conference on Computer Vision and Pattern Recognition, pp. 8660-8669 (2019).

Zhan, W., et al., "Interaction dataset: An international, adversarial and cooperative motion dataset in interactive driving scenarios with semantic maps," arXiv preprint arXiv:1910.03088, Computer Vision and Pattern Recognition, pp. 13 (2019).

Kamenev, Alexey; International Preliminary Report on Patentability for PCT Application No. PCT/US2021/023338, filed Mar. 19, 2021, dated Sep. 29, 2022, 9 pgs.

* cited by examiner

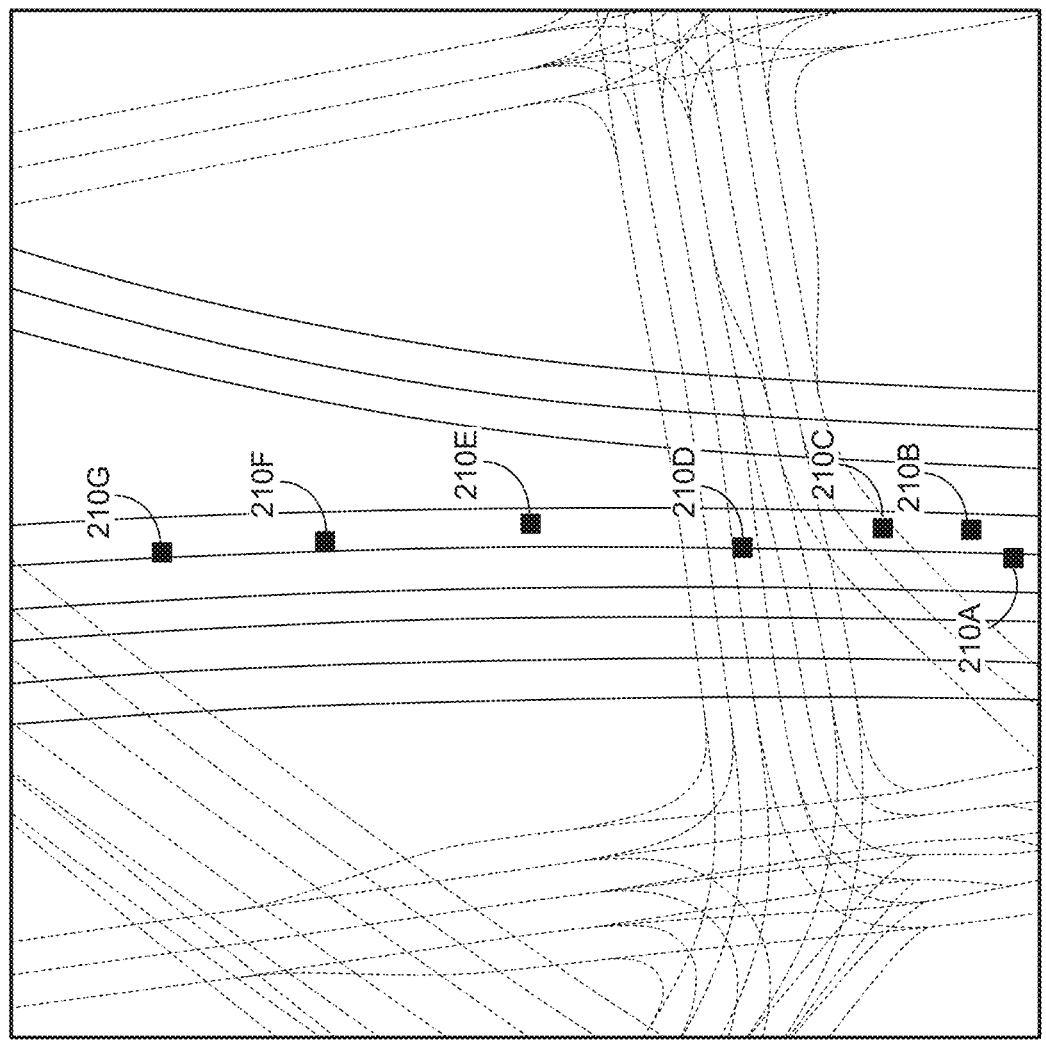

FUTURE TRAJECTORY PREDICTIONS IN MULTI-ACTOR ENVIRONMENTS FOR AUTONOMOUS MACHINE

BACKGROUND

For autonomous vehicles to navigate effectively, the autonomous vehicles need to generate an understanding of the surrounding environment. For example, identifying locations of nearby cars, pedestrians, traffic signs and signals, and road configurations are key aspects for enabling safe control by autonomous vehicles. In addition to current locations and configurations of objects in the environment, determining possible future trajectories of these objects over time—through observation by the autonomous vehicles—may prove effective in fully understanding and accounting for predicted changes in the environment.

Conventional systems have leveraged past object trajectory information using a single actor approach, where an understanding of actors surrounding an ego-vehicle may be determined, and then a determination of future trajectories for each actor may be individually computed. For example, some conventional systems rely on a combined network for determining high-level features corresponding to actors in the environment, and then perform individual computations for each actor based on the high-level features. These systems may or may not predict multi-path trajectories or single mode trajectories. Other conventional systems may compute—such as by using variational autoencoders (VAEs)—possible future trajectories of actors of the environment. However, these conventional systems are not computing the future trajectories based on past trajectories of the respective actor, but instead are computing potential future trajectories based on historical information of possible trajectories given a certain map structure. As such, these conventional approaches are limited to either predicting future locations for a single object at a time—thereby limiting the effectiveness of the information for autonomous driving applications—or to predicting many possible trajectories that do not directly correspond to an actual predicted future trajectory for an actor. Where these conventional processes are repeated for each object, the runtime of the system becomes ineffective for real-time deployment due to the processing burden on the system.

SUMMARY

Embodiments of the present disclosure relate to future trajectory predictions in multi-actor environments for autonomous machine applications. Systems and methods are disclosed that leverage previously tracked actor locations and map information to predict—e.g., using a deep neural network (DNN), such as a recurrent neural network (RNN)—future locations of the actors. In addition to prior locations and map information, wait conditions, free-space boundary information, and/or other environmental information may be leveraged by the system to compute accurate and reliable predictions of future actor locations.

In contrast to conventional systems, such as those described above, the present system computes future trajectories for any number of actors at the same time using a deep neural network (DNN), such as a recurrent neural network (RNN). Information from a perception stack—e.g., as generated using one or more sensors of a vehicle—may be used to compute prior locations of actors in an environment. This information, in addition to map information—e.g., locations of static objects, wait condition information, free-space boundary locations, road structure information, etc.—may be applied to the DNN. In some embodiments, to avoid accuracy issues associated with perspective top-down view or top-down orthogonal projection view data during processing of the data by the DNN, the map information and the prior location information may be mapped to a top-down view and rasterized to generate images representative thereof. Using this information, the DNN may compute confidence maps (e.g., representative of confidences corresponding to the presence of actors) and vector fields for any number of future time slices, and the vector fields may be used to track actors from time slice to time slice—e.g., in a reverse order of time. In some embodiments, clustering and/or weighted averaging may be used to determine a final future location for each actor, such as when a plurality of points in a confidence map indicate the presence of an actor. As a result, a trajectory representing past and/or future locations of each actor may be generated and used by the ego-vehicle to aid in navigating the environment—e.g., for path planning, control decisions, obstacle avoidance, etc.

BRIEF DESCRIPTION OF THE DRAWINGS

The present systems and methods for future trajectory predictions in multi-actor environments for autonomous machine applications are described in detail below with reference to the attached drawing figures, wherein:

FIGS. 2A-2B depict visual representations of example inputs to a DNN, in accordance with some embodiments of the present disclosure;

DETAILED DESCRIPTION

Systems and methods are disclosed related to future trajectory predictions—using one or more deep neural networks (DNNs)—in multi-actor environments for autonomous machine applications. Although the present disclosure may be described with respect to an example autonomous vehicle 600 (alternatively referred to herein as "vehicle 600" or "ego-vehicle 600", an example of which is described with respect to FIGS. 6A-6D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving or ADAS systems, this is not intended to be limiting. For example, the systems and methods described herein may be used in simulation environment (e.g., to more accurately simulate movement and control of objects in the simulation environment), in robotics, aerial systems, boating systems, and/or other technology areas, such as for perception, world model management, path planning, obstacle avoidance, and/or other processes.

System for Future Trajectory Predictions Using a DNN

Figure 1A:
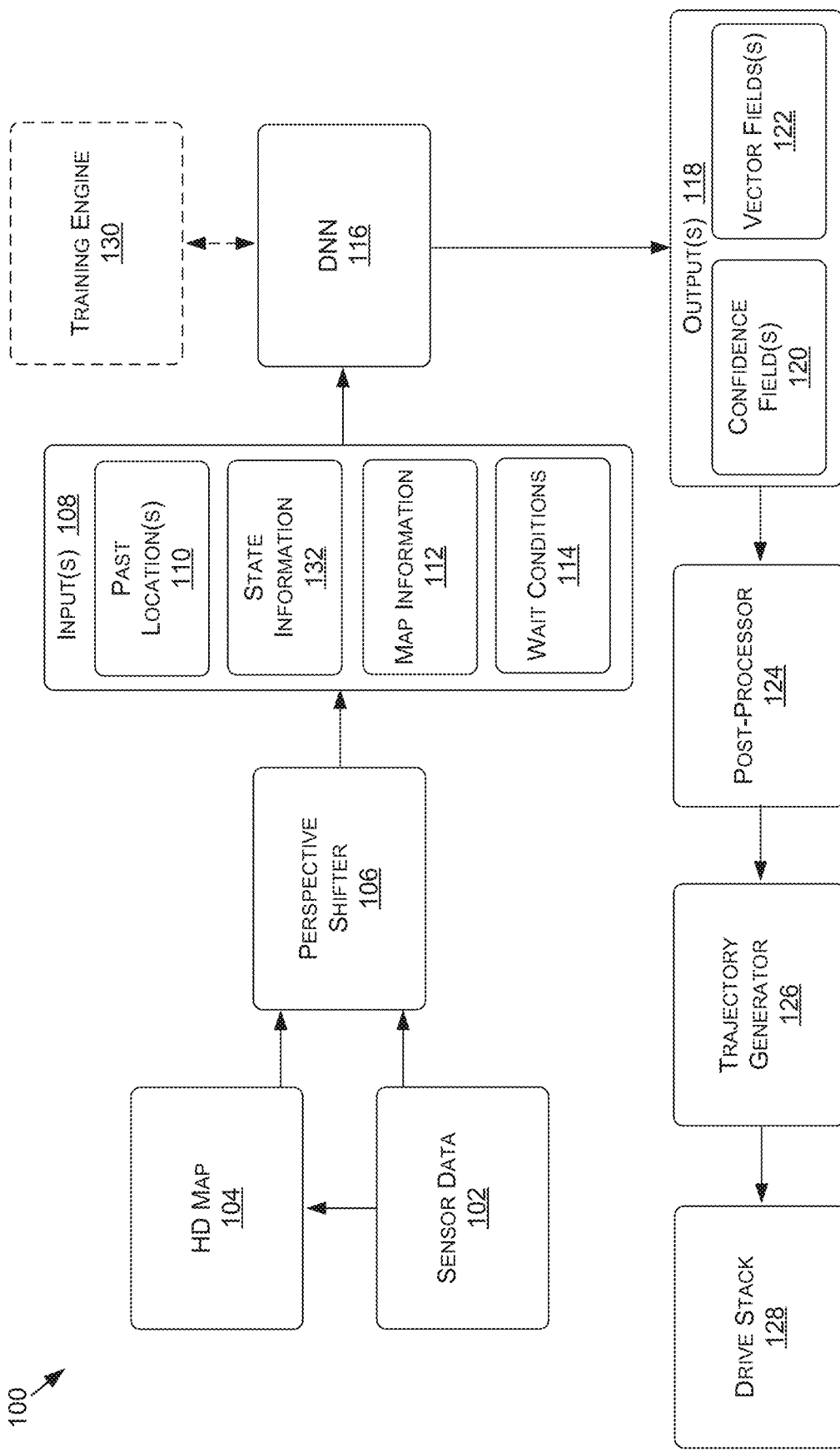
FIG. 1A includes an example data flow diagram for a process of predicting trajectories of one or more actors in an environment, in accordance with some embodiments of the present disclosure.

With reference to FIG. 1A, FIG. 1A is an example data flow diagram for a process 100 of predicting trajectories of one or more actors in an environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown in FIG. 1A, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include generating and/or receiving sensor data 102 from one or more sensors of the vehicle 600. The sensor data 102 may be used by the vehicle 600, and within the process 100, to predict future trajectories of one or more objects or actors—such as other vehicles, pedestrians, bicyclists, etc.—in the environment. The sensor data 102 may include, without limitation, sensor data 102 from any of the sensors of the vehicle 600 (and/or other vehicles or objects, such as robotic devices, VR systems, AR systems, etc., in some examples). For example, and with reference to FIGS. 6A-6C, the sensor data 102 may include the data generated by, without limitation, global navigation satellite systems (GNSS) sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600 and/or distance traveled), and/or other sensor types.

In some examples, the sensor data 102 may include the sensor data generated by one or more forward-facing sensors, side-view sensors, and/or rear-view sensors. This sensor data 102 may be useful for identifying, detecting, classifying, and/or tracking movement of objects around the vehicle 600 within the environment. In embodiments, any number of sensors may be used to incorporate multiple fields of view (e.g., the fields of view of the long-range cameras 698, the forward-facing stereo camera 668, and/or the forward facing wide-view camera 670 of FIG. 6B) and/or sensory fields (e.g., of a LIDAR sensor 664, a RADAR sensor 660, etc.).

The sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

In addition, the process 100 may include generating and/or receiving map data from a map—such as an HD map 104 (which may be similar to the HD map 622 of FIG. 6C)—accessible by and/or stored by the vehicle 600. The HD map 104 may include, in some embodiments, precision to a centimeter-level of finer, such that the vehicle 600 may rely on the HD map 104 precise instructions, planning, and localization. The HD map 104 may represent lanes, road boundaries, road shape, elevation, slope, and/or contour, heading information, wait conditions, static object locations, and/or other information. As such, the process 100 may use the information from the HD map 104—such as locations and shapes of lanes—to generate inputs 108 for DNN 116.

In addition to, or alternatively from, the sensor data 102 and/or the HD map 104, the process 100 may include generating and/or receiving (e.g., using the sensor data 102 and/or the HD map 104, in embodiments) one or more outputs from an autonomous or semi-autonomous (e.g., ADAS) driving software stack. For example, information generated by a perception layer, a world model management layer, a control layer, an actuation layer, an obstacle avoidance layer, and/or other layers of a software stack may be used within the process 100 for generating the inputs 108. This information may include free-space boundary locations, wait conditions, intersection structure detection, lane type identification, road shape information, object detection and/or classification information, and/or the like. As such, the sensor data 102, the HD map 104, and/or other information generated by the vehicle 600 may be used to generate the inputs 108 for the DNN 116.

In some non-limiting embodiments, the sensor data 102, the information from the HD map 104, and/or other information (e.g., from a driving stack) may be applied to a perspective shifter 106 prior to being used as an input 108 to the DNN 116. The perspective shifter 106 may orient the data with respect to one of the actors in the environment, with respect to some location on the road surface, and/or with respect to another feature represented by the data. For example, in some embodiments, the perspective shifter 106 may shift the perspective of the data with respect to a location and/or orientation of the vehicle 600 (e.g., an ego-vehicle, or ego-actor). As such, locations of actors or objects, the portion of the HD map 104, and/or other information to be used as an input 108 may be shifted relative to the vehicle 600 (e.g., with the ego-vehicle 600 at the center, at (x, y) coordinates of (0, 0), where y is a longitudinal dimension extending from front to rear of the vehicle and x is a lateral dimension perpendicular to y and extending from left to right of the vehicle, similar to the representation of an origin 432 in FIG. 4B). In some embodiments, in addition to or alternatively to shifting the perspective with respect to a feature of the environment, the perspective shifter 106 may shift the perspective to a same field of view. For example, where the HD map 104 may generate data from a top-down perspective of the environment, the sensors that generate the sensor data 102 may do so from different perspectives —such as front-facing, side-facing, angled downward, angled upward, etc. As such, to generate inputs 108 that share a same perspective, the perspective shifter 106 may adjust each of the inputs 108 to a same perspective. In some non-limiting embodiments, each of the sensor data 102, the HD map 104, and/or other information may be shifted to a top-down view perspective—e.g., a perspective top-down view and/or an orthogonal top-down view. In addition, the perspective shifter 106 may aid in generating the inputs 108 such that a same or substantially similar (e.g., within centimeters, meters, etc.) portion of the environment is represented from the perspective for each instance of the inputs 108. For example, a first input (e.g., a rasterized image) representing past locations 110 of actors in the environment may be represented by a top-down perspective of a portion of the environment and a second input (e.g., a rasterized image) representing map information 112 of the environment may be represented by a top-down perspective of the portion of the environment. As a result, the DNN 116 may generate outputs 118 using any number of inputs 108 corresponding to a same general portion of the environment and thus at a similar scale. However, this is not intended to be limiting, and in some embodiments the perspectives, orientations, size, locations, and scale of the inputs 108 may differ for different input types and/or instances.

The inputs 108 may include past location(s) 110 (e.g., of actors in the environment, such as vehicles, pedestrians, bicyclists, robots, drones, watercraft, etc., depending on the implementation), state information 132 (e.g., velocity and/or acceleration data corresponding to the actors), map information 112 (e.g., as generated using the HD map 104), wait conditions 114 (e.g., generated using the sensor data 102, the HD map 104, and/or other information), and/or other inputs 108 (e.g., free-space information, static object information, etc., as determined using the sensor data 102, the HD map 104, a drive stack 128 of the vehicle 600, and/or other information). The past location(s) 110 may include prior detected locations of vehicles, pedestrians, bicyclists, and/or other actor types in the environment. In some embodiments, the past location(s) 110 may be determined with respect to the ego-vehicle 600 such that, during perspective shifting, the change in orientation and location with respect to the actors is accomplished more efficiently. The past location(s) 110 and/or the state information 132 may be represented by an image (e.g., a rasterized image) representative of locations of the actors. In some embodiments, each instance of the past locations 110 may include a single image and may correspond to a single time slice—e.g., an instance may capture each of the actors being tracked and/or that are detected and their current location (e.g., relative to the vehicle 600) at the time slice. In some embodiments, each instance of the state information 132 may include a single image and may correspond to a single time slice. In other embodiments, the state information 132 may be included in the image instances along with the past locations 110. The DNN 116 may take as input one or more instances of the past locations 110 and/or the state information 132, such that DNN 116 may compute the outputs 118 using one or more instances of the past locations 110 and/or the state information 132 that correspond to locations of actors over one or more time slices (e.g., over a period of time).

Figure 2A:
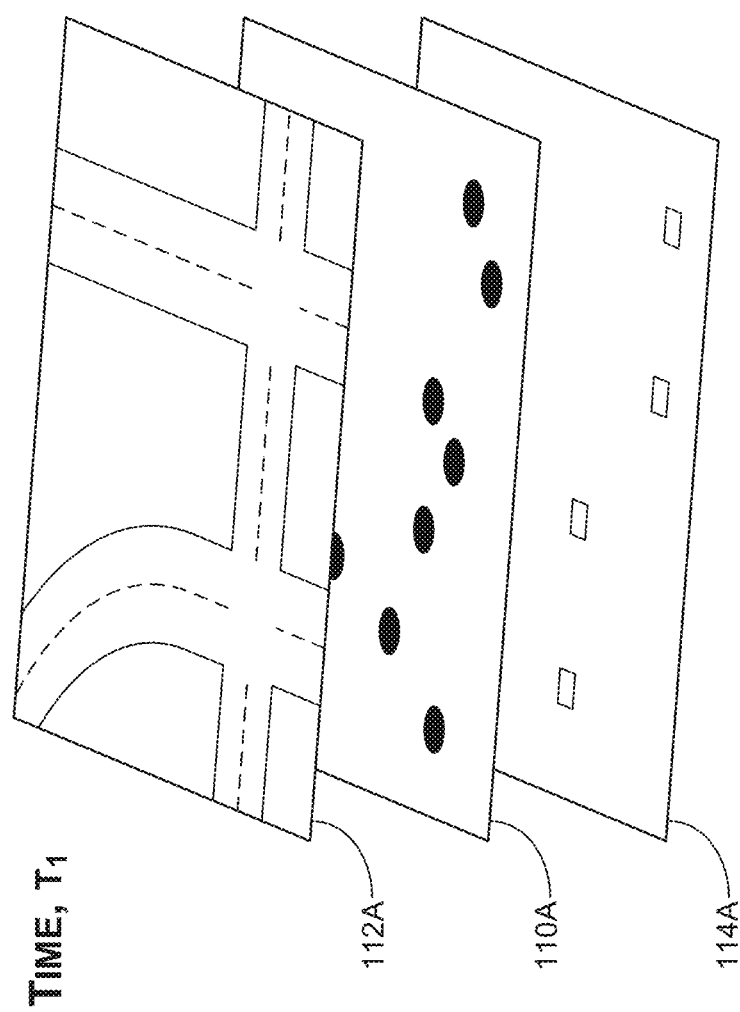

For example, with respect to FIG. 2A, various inputs 108 corresponding to a time slice at a time, $T_1$, may include past locations 110A (and/or may include the state information 132 corresponding thereto). As such, each of the black ovals may correspond to a location and/or state information of an actor in the environment—including the ego-vehicle 600, in embodiments. Similarly, with respect to FIG. 2B, for a time slice at a time, $T_2$, actors 210A-210G may be detected at locations within the environment. As such, visualization 202 of FIG. 2B may represent the past locations 110 and the map information 112 at the time, $T_2$. As a non-limiting example, the locations of each actor 210 may be oriented with respect to an ego-actor—which may be the centrally located actor 210E in the visualization 202—such that the DNN 116 may be conditioned on the ego-actor.

The map information 112 may include locations of lanes (e.g., lane center-lines or rails, lane edges or dividers, road boundaries, emergency lanes, etc.), locations of static objects, locations of intersections, road shape information, and/or the like. In some embodiments, the map information 112 may be determined with respect to the ego-vehicle 600 such that, during perspective shifting, the change in orientation and location with respect to the map information is accomplished more efficiently. The map information 112 may be represented by an image (e.g., a rasterized image) representative of the lane locations, static object locations, etc. In some embodiments, each instance of the map information 112 may include a single image and may correspond to a single time slice—e.g., an instance may capture the driving surface structure (e.g., relative to the vehicle 600) at the time slice. The DNN 116 may take as input one or more instances of the map information 112, such that DNN 116 may compute the outputs 118 using one or more instances of the map information 112 that correspond to the road structure information over various time slices (e.g., over a period of time). In some non-limiting embodiments, for each time slice within a period of time, a same map information 112 may be used (e.g., a same instance of the map information 112 may be used for every two time slices, every three time slices, etc., and then may be updated at a same interval). In other embodiments, the map information 112 may be updated at each time slice.

As an example, with respect to FIG. 2A, various inputs 108 corresponding to a time slice at a time, $T_1$, may include map information 112A. As such, the map information 112A may include lane lines, line types, road shape and/or structure, and/or other features. Similarly, with respect to FIG. 2B, for a time slice at a time, $T_2$, the road structure may be represented. As a non-limiting example, the map information 112 may be oriented with respect to an ego-actor—which may be the centrally located actor 210E in the visualization 202—such that the DNN 116 may be conditioned on the ego-actor.

The wait conditions 114 may include locations of—or locations of intersections governed by—stop lights, yield signs, stop signs, construction, cross-walks, and/or other wait conditions. In some embodiments, the wait conditions 114 may be included in the map information 112, while in other embodiments, the wait conditions 114 may represent a separate input channel to the DNN 116. In some embodiments, the wait conditions 114, similar to the past location 110 and/or the map information 112, may be determined with respect to the ego-vehicle 600 such that, during perspective shifting, the change in orientation and location with respect to the wait conditions 114 is accomplished more efficiently. The wait conditions 114 may be represented by an image (e.g., a rasterized image) representative of the locations and/or types of wait conditions in the environment. In some embodiments, each instance of the wait conditions 114 may include a single image and may correspond to a single time slice—e.g., an instance may capture the wait conditions (e.g., relative to the vehicle 600) at the time slice. The DNN 116 may take as input one or more instances of the wait conditions 114, such that DNN 116 may compute the outputs 118 using one or more instances of the wait conditions that correspond to the wait condition locations and/or types over various time slices (e.g., over a period of time). In some non-limiting embodiments, for each time slice within a period of time, a same wait conditions 114 may be used (e.g., a same instance of the wait conditions 114 may be used for every two time slices, every three time slices, etc., and then may be updated at a same interval). In other embodiments, the wait conditions 114 may be updated at each time slice. As an example, with respect to FIG. 2A, various inputs 108 corresponding to a time slice at a time, $T_1$, may include wait conditions 114A. As such, the wait conditions 114A may include stop signs, stop lights, yield signs, emergency vehicle entry locations, and/or other wait condition types.

The inputs 108—e.g., after perspective shifting and/or rasterization—may be applied to the DNN 116 as input tensors. For example, each respective input—e.g., the map information 112, the past locations 110, the wait conditions 114, other inputs types, etc.—may each be applied as a separate input tensor to a channel(s) of the DNN 116. As described herein, in some embodiments, each input type may be associated with an individual input tensor and/or input channel. In other embodiments, two or more of the input types (e.g., the wait conditions 114 and the map information 112) may be combined to form a single input tensor for a single input channel to the DNN 116.

In some embodiments, the DNN 116 may include a temporal and/or spatial DNN such that the DNN 116 analyzes, at each instance, information corresponding to more than one time slice (e.g., a period of time) and/or analyzed, at each instance, information corresponding to more than one spatial location of actors. As such, the DNN 116 may learn to predict future trajectories—or information representative thereof—by monitoring and factoring in past locations of actors, road structures, wait conditions, and/or other information over a plurality of time slices. In some embodiments, the DNN 116 may include a recurrent neural network (RNN). For a non-limiting example, and as described in more detail below with respect to FIG. 1B, the DNN 116 may include an encoder-decoder RNN 116A.

Although examples are described herein with respect to using neural networks, and specifically RNNs, as the DNN 116, this is not intended to be limiting. For example, and without limitation, the DNN 116 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 1B:
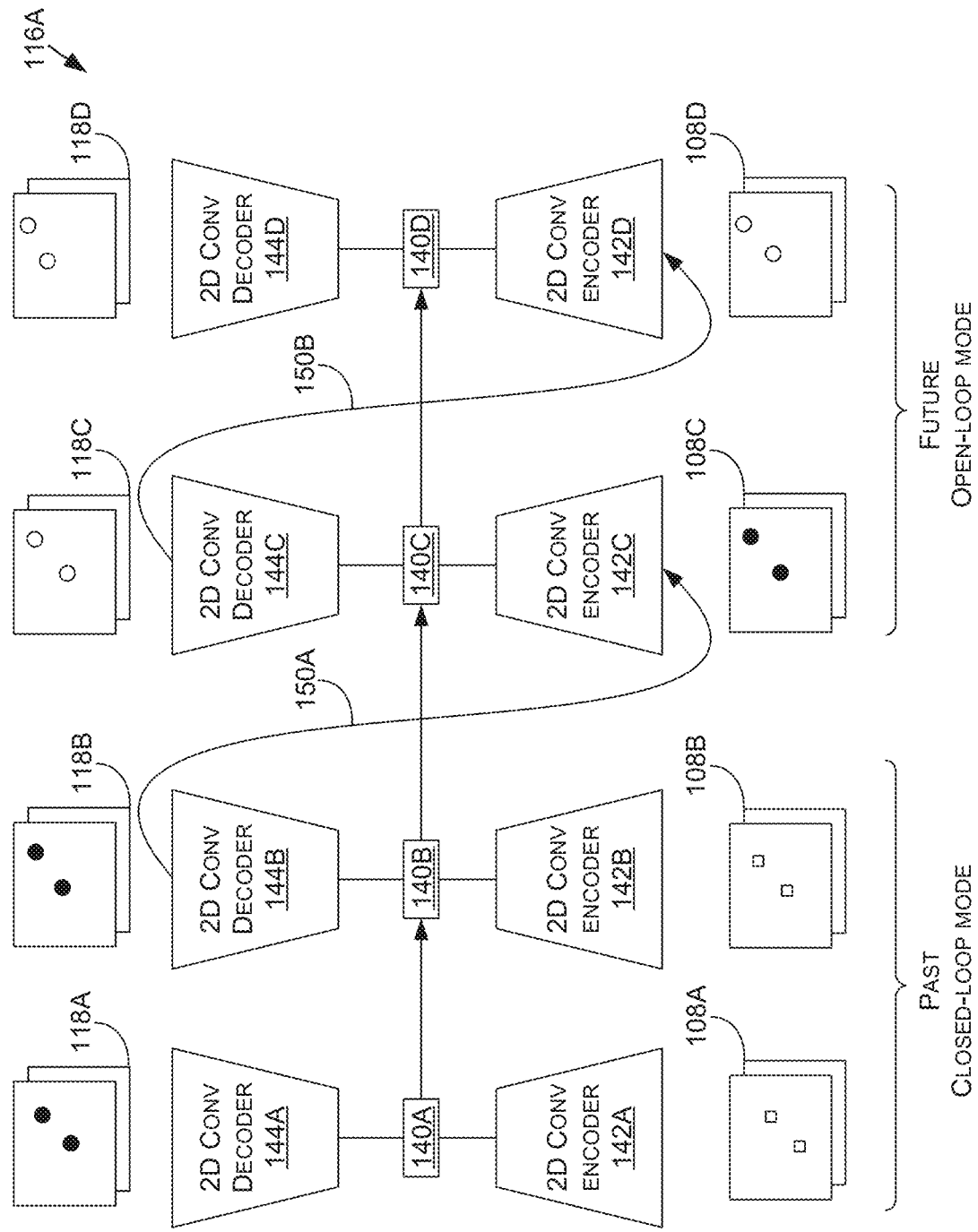
FIG. 1B depicts an example deep neural network (DNN) architecture suitable for implementation in at least one embodiment of the process of FIG. 1A, in accordance with some embodiments of the present disclosure.
Figure 3A:
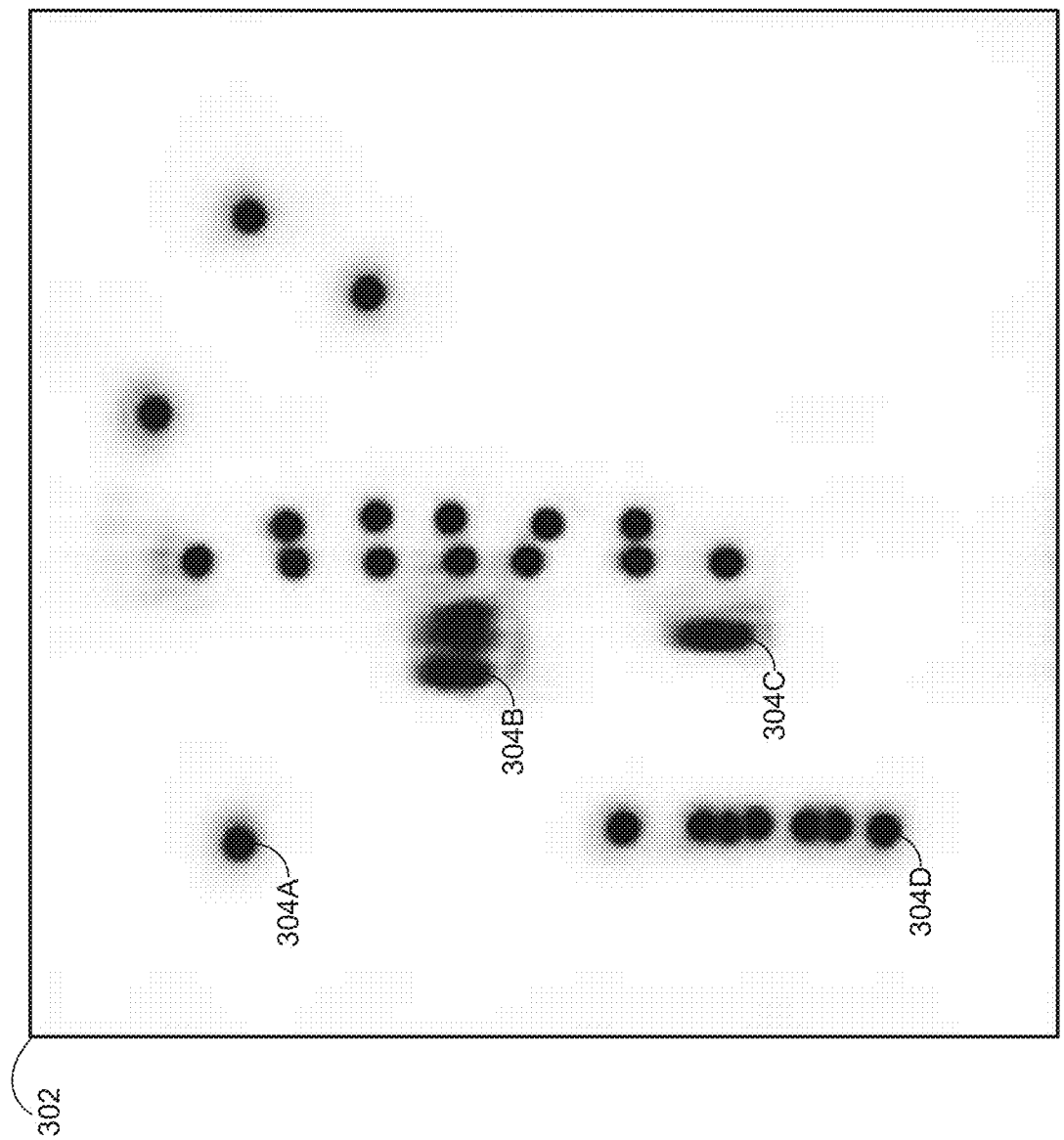
FIGS. 3A-3B depict visual representations of example outputs from a DNN, in accordance with some embodiments of the present disclosure.
Figure 3B:
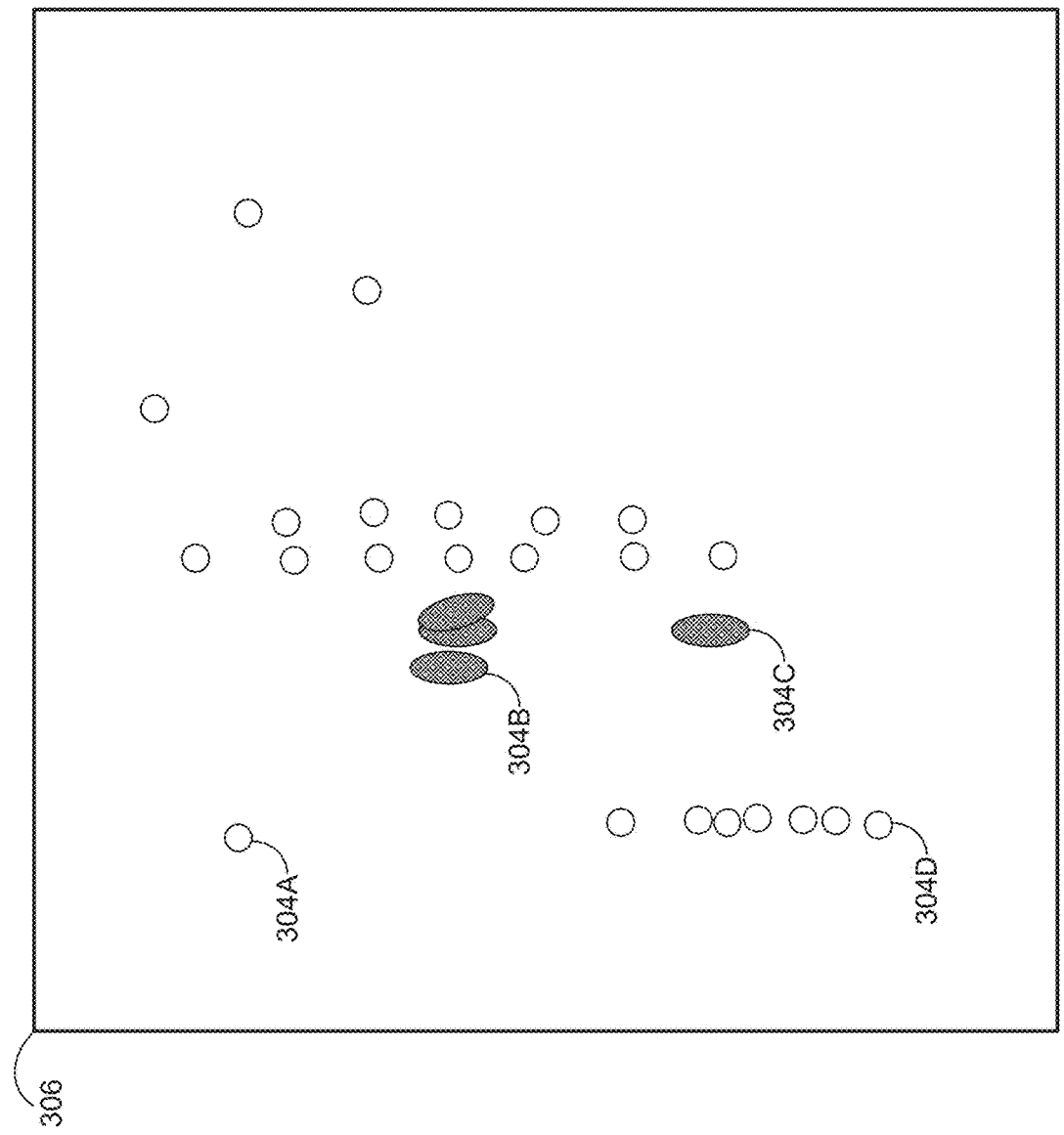

Now with reference to FIG. 1B, FIG. 1B depicts an example architecture for the DNN 116. The DNN 116A includes a plurality of encoder-decoder stacks that may each include a 2D convolutional encoder 142 (e.g., 142A-142D), a 2D convolutional decoder 144 (e.g., 144A-144D), and/or a 2D convolutional RNN 146 (e.g., 146A-146D). The CNN 116A may be configured to receive any number of time slices worth of past information and predict any number of time slices worth of future information, depending on the embodiments. For example, the CNN 116A may generate a trajectory that includes information over the past two seconds and two seconds into the future—e.g., where a trajectory point is output every second, every half second, four times a second, eight times a second, and so on. The inputs 108A-108D may be similar to the inputs 108 described with respect to FIGS. 2A-2B, and the outputs 118A-118D may be similar to the outputs described with respect to FIGS. 3A-3C. For example, the inputs 108 may include a tensor(s) corresponding to past and/or predicted future locations of actors, a tensor(s) corresponding to wait conditions 114, a tensor(s) corresponding to map information 112, etc. The outputs 118 may include a tensor(s) corresponding to a confidence field, a tensor(s) corresponding to a vector field(s), etc. In some embodiments, because the inputs 108 in the closed-loop mode are based on actual (e.g., ground truth) locations of actors in the environment, the outputs 118 in the closed-loop mode may be more precise—e.g., may include a smaller area of potential locations for the actors which may be closer to a 1:1 correspondence between the input 108 and the output 118. In addition, because the inputs 108 in the open-loop mode may be based on future predictions of locations of the actors, the outputs 118 in the open-loop mode may be less precise—e.g., may include a larger area of potential locations for the actors, as described herein at least with respect to FIGS. 3A-3C.

The CNN 116A may include a past closed-loop mode and a future open-loop mode. In some embodiments, the past closed-loop mode may take as inputs 108 actual past location(s) 110 of actors in the environment (in addition to other inputs 108, such as the map information 112, the wait conditions 114, etc.) in order to generate the outputs 118—e.g., as indicated by square boxes on the inputs 108A and 108B. The future open-loop mode may take as inputs 108 the predictions of a 2D convolutional decoder 144B based on actual past locations 110 of the actors as predicted by the DNN 116A (e.g., as indicated by black-filled circles and arrow 150A) and/or may take as input future predictions of locations of actors as predicted by the DNN 116A, such as by a 2D convolutional decoder 144C (e.g., as indicated by white-filled circles and arrow 150B). As such, the outputs 108 in the closed-loop mode may be based on actual tracked locations of the actors in the environment and the open-loop mode may be based on actual tracked locations of the actors and/or the future predicted locations of the actors. For example, states may be shared between various encoder-decoder stacks 140, as indicated by arrows between 140A and 140B, 140B and 140C, and so on. The state information may be passed such that the predictions of the encoder-decoder stack 140B factor in state information of the encoder-decoder stack 140A, and so on.

Referring again to FIG. 1A, the outputs 118 of the DNN 116 may include confidence field(s) 120, vector field(s) 122, and/or other output types. The combination of the confidence field(s) 120 and the vector field(s) 122 may be used by a post-processor 124—described in more detail herein—to determine the full trajectory of the actors in the environment, which may include one or more past trajectory points or locations and/or one or more future trajectory points or locations. In some non-limiting embodiments, the confidence field(s) 120 and the vector field(s) 122 for a time slice may correspond to a same region of the environment (e.g., a same area) and thus may be of a same spatial dimension.

The confidence field(s) 120 may include, for each time slice (e.g., past, present, and/or future), a confidence field or map that represents confidences of where actors are located. The confidence field 120 may be represented by a H×W matrix, where each element (e.g., pixel or point) is representative of a confidence score. For example, each pixel or point in the confidence field 120 or map may have an associated confidence that an actor is present. As such, and especially for future predictions, the confidences field(s) 120 may appear more similar to the illustration of FIG. 3A. For example, visualization 302 of FIG. 3A may represent a plurality of confidence fields 120 corresponding to a plurality of time slices overlaid on one another. For example, whereas FIG. 3C include a separate time slice for each confidence field 120A-120C, the visualization 302 may include a plurality of the time slices compressed into a single plane that corresponds to an area in an environment (e.g., from a top-down perspective). This visualization 302 may be helpful for visualizing static and dynamic or moving objects over time. For example, regions 304A and 304D may correspond to static actors and thus may be represented by shapes that are substantially circular while regions 304B and 304C may correspond to moving or dynamic actors and thus may be represented by shapes that are oval or otherwise indicate a plurality of predictions corresponding to different locations in the environment for the actors over time.

The vector field(s) 122 may include, for each time slice (e.g., past, present, and/or future), a vector field 122 or map that represents vectors (e.g., displacement vectors) corresponding to predictions of where an actor at the location of the vector was at the prior time slice. The vector field 122 may include an H×W matrix where each element (e.g., pixel or point) represents a 2D (or 3D, in embodiments) vector corresponding to a displacement from a current vector location to a point (e.g., a center point) of a same object or actor in a previous time slice (or time step). Each vector may be represented by, in some non-limiting embodiments, a direction and magnitude, a distance (e.g., a pixel distance) along the 2D or 3D space, and/or another representation. For example, each pixel or point in the vector field 122 or map for a time, $T_n$, may have an associated vector that represents where an actor—if an actor is present at the pixel or point—is predicted to be located at a prior time, $T_{n-1}$ (although, in embodiments, the DNN 116 may be trained to compute the vector fields 122 that correspond to a future time, $T_{n+1}$, for example). With respect to FIG. 3B, visualization 306 may represent a plurality of vector fields 122 overlaid on one another and may similarly correspond to the environment over the same period of time as the visualization 302 of FIG. 3A. This visualization 306 may further be helpful for visualizing static and dynamic or moving objects over time. For example, regions 304A and 304D may correspond to static actors and thus may be represented by shapes that are substantially circular while regions 304B and 304C may correspond to moving or dynamic actors and thus may be represented by shapes that are oval or otherwise indicate a plurality of predictions corresponding to different locations in the environment for the actors over time.

The post-processor 124 may use the confidence field(s) 120 and the vector field(s) 122 to determine trajectories for the various actors in the environment. For example, the confidence field 120 corresponding to a last future time slice (e.g., $T_n$) of the outputs 118 may be analyzed by the post-processor 124 to determine locations of actors, and the corresponding vectors from the vector field 122 at the same time slice may be leveraged to determine predicted locations of the actors in a confidence field 120 from a preceding time slice (e.g., $T_{n-1}$). The confidence field 120 from the preceding time slice may then be used to determine the locations of the actors at that time slice (e.g., $T_{n-1}$), and then the vector field 122 from that time slice may be used to determine predicted locations of the actors in a confidence field 120 from a preceding time slice (e.g., $T_{n-2}$), and so on, until a current time is reached. A trajectory generator 126 may then append these future predictions to the past trajectory of the actors as determined from actual detections of the actors to generate a final trajectory. In some embodiments, the past trajectory may also be generated using a similar process as for the future trajectories, where the confidence fields 120 are used to determine locations at a time slice and the vector fields 122 are used to determine locations at prior time slices.

For a confidence field 120 corresponding to a time slice (e.g., as indicated by a time stamp, for example), the location of the actors may be determined using any number of different methods such as, without limitation, clustering-inclusive processes (e.g., non-maxima suppression, density-based spatial clustering of applications with noise (DB-SCAN), etc.) and/or clustering-free processes. For example, where clustering is used, a confidence threshold may be applied to remove noisy points. In such examples, the confidence threshold may be, without limitation, 0.7, 0.8, 0.85, 0.9, etc. Once the noisy points are filtered out, the remaining points may have a clustering algorithm applied to them such that points that are within a threshold distance to one another may be determined to be associated with a single actor. In some embodiments, once the clusters are determined, one or more of the vectors from the vector field 122 of the same time slice that correspond to the same points may be used to find a location of a corresponding actor (or cluster representative thereof) in a preceding time slice. In other embodiments, once the clusters are determined, a centroid of each cluster may be determined, and a predetermined size bounding shape (e.g., same size for all clusters, different size for clusters corresponding to different actor types—e.g., first size bounding shape for cars, second size bounding shape for pedestrians, and so on) may be centered at the centroid (e.g., centroid of bounding shape centered on the centroid of the cluster). The bounding shape may then be used as a mask for the vector field 122 of the same time slice to determine which vectors to use for finding a location of a corresponding actor (or cluster or bounding shape representative thereof) in a preceding time slice. These processes may be completed for each time slice until a full trajectory through each time slice is determined. In examples where another actor (or cluster or bounding shape representative thereof) is not located at the prior time slice using the vector field 122, the trajectory may be shortened, may be discarded (e.g., may be noise, a bug, etc.), and/or may be estimated based on past temporal information.

As another example, where clustering is not used, another algorithm or method may be implemented to determine the locations of actors. For example, a weighted averaging approach may be used where the confidence field(s) 120 and the vector field(s) 122 may be processed for each actor in a single pass—having the inherent compute benefit of fast processing times regardless of the number of actors. In such an algorithm, for each actor, a, a most probable next position may be the average of all positions whose predecessor vector points to a, weighted by the confidence field(s) 120 values at those positions. The weighted averages may be computed for all actors at once using auxiliary numerator and denominator storage—both initialized to zero. For each position, pos, in the output of the DNN 116, the predecessor, pred=predecessor[pos] and the occupancy, o=occupancy[pos]. Then add o*pos to numerator[pred], and add o to denominator[pred]. The next position for each actor, a, may be determined by numerator[a.position]/denominator[a.position]. The numerator stores the weighted sum of all positions whose predecessor vector points to a, and the denominator stores the sum of their weights, so the result is a weighted average. Since the operation to apply for each position is largely independent, these steps may be performed in parallel (e.g., using a graphics processing unit (GPU) across multiple threads in parallel).

As another example, for each actor, a, the confidence field 120 for a given time slice may be filtered to include pixels or points whose predecessor vector points to actor, a. The (soft) argmax function may be applied to the remaining points to determine a "center of mass" of the points. Specifically, the result may be the occupancy-weighted sum of all of the positions whose predecessor points to a. This may be determined to be the most likely future position for a. This process may be repeated for each other actor. In some embodiments, a separate pass may be executed over the same confidence field 120 for each actor, and this may be repeated at each time slice. As a result, the overall runtime of the system may be greater than desired for real-time or near real-time deployment. To avoid this, and to perform per-actor operations for all actors jointly, two partial sums may be stored. A first sum of weights for a shape H×W, according to equation (1), below:

$$\text{sum\_weights}[y, x] = \sum_{i,j \in H,W} \begin{cases} \text{occupancy}[i, j] & \text{if predecessor}[i, j] = (y, x) \\ 0 & \text{otherwise} \end{cases} \tag{1}$$

and a second sum of weights for a shape H×W×2, according to equation (2) below:

$$\text{sum\_weighted\_coords}[y, x, :] = \sum_{i,j \in H,W} \begin{cases} (i, j) \cdot \text{occupancy}[i, j] & \text{if predecessor}[i, j] = (y, x) \\ 0 & \text{otherwise} \end{cases} \tag{2}$$

Then, to find the most likely successor for actor, a, equation (3) may be used $$\text{sum\_weighted\_coords}[a.\text{bbox.sum}(\,)]/\text{sum\_weights}[a.\text{bbox}].\text{sum}(\,) \tag{3}$$

which may represent an occupancy-weighted average of all next-frame positions whose predecessor points to actor a (or a bounding box corresponding thereto).

In some examples, because the occupancy scores (e.g., from the confidence fields 120) are not probabilities, to avoid over-spreading trajectories, a sharpening operation may be performed. For example, a sharpening operation may be applied to the confidence fields 120 to assign higher weights to higher confidence scored points before computing the weighted average. In a non-limiting embodiments, the sharpening may be hard-coded with a sharpening strength of 40, as represented in equation (4), below:

$$\text{sharpen}(x) = e^{40 \cdot x - 40.6} \tag{4}$$

However, the sharpening function may also be learned or trained in some embodiments.

Figure 3C:
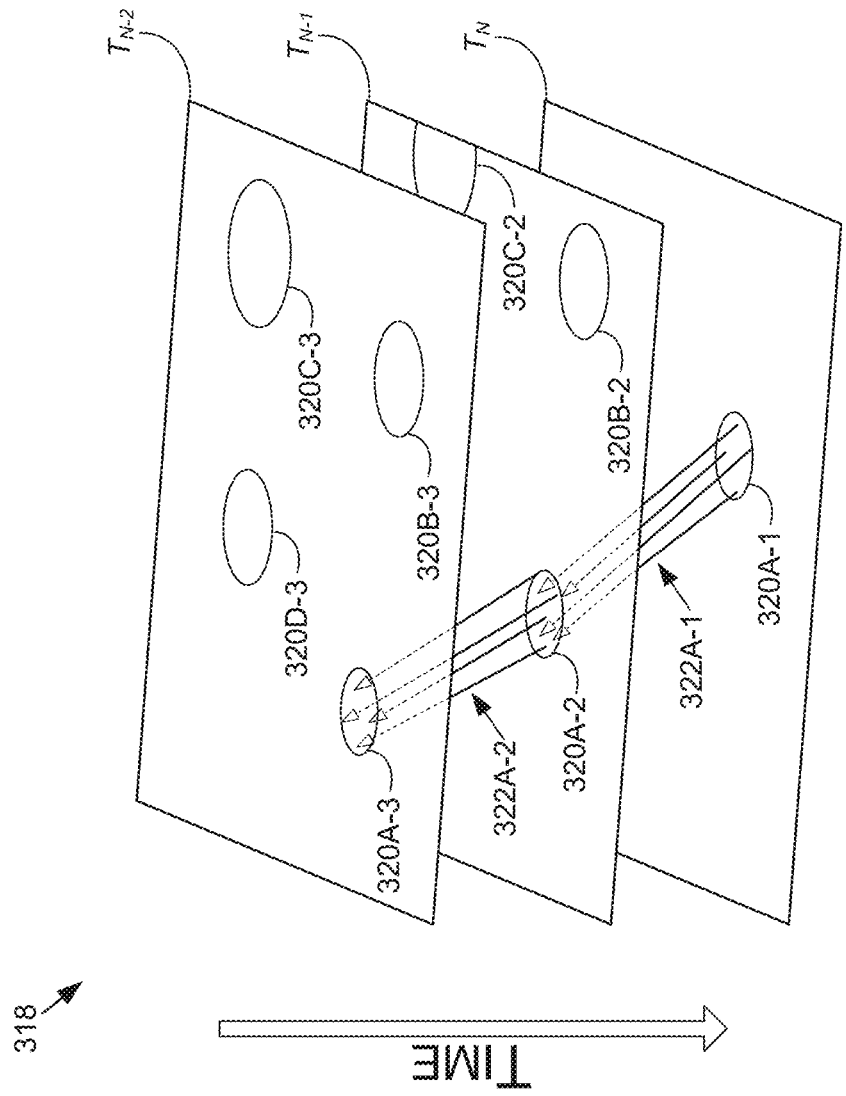
FIG. 3C depicts a visual representation of using example outputs from a DNN to generate trajectories for actors in an environment, in accordance with some embodiments of the present disclosure.

As an example, and with respect to FIG. 3C, a first time slice, $T_N$, may include a number of different groups of points 320 (e.g., 320A). The groups of points (or clusters) 320 may be identified using clustering, weighted averaging, and/or other techniques, such as those described herein. For example, at time slice, $T_N$, the group of points 320A-1 may be determined (other groups of points 320 may also be determined, but may be occluded in the visualization 318 by other time slices (e.g., $T_{N-1}$ and $T_{N-2}$), and a set of vectors 322A-1 from the vector field 122 corresponding to the time slice, $T_N$, may be determined as a result (e.g., the group of vectors from the vector field 122 corresponding to the same (x, y) coordinates as the group of points 320 in the confidence field 120). The set of vectors 322A-1 may point to a group of points 320A-2 at the time slice, $T_{N-1}$. As a result, a connection between the group of points 320A-1 and 320A-2 may be made, attributed to a same actor, and used to generate trajectory points at time slices $T_N$ and $T_{N-1}$. Similarly, at time slice, $T_{N-1}$, the group of points 320A-2 may be determined, and a set of vectors 322A-2 from the vector field 122 corresponding to the time slice, $T_{N-1}$, may be determined as a result. The set of vectors 322A-2 may point to a group of points 320A-3 at the time slice, $T_{N-2}$. As a result, a connection between the group of points 320A-2 and 320A-3 may be made, attributed to a same actor, and used to generate an additional trajectory point at time slice $T_{N-2}$. Although not illustrated, this process may be repeated for any number of actors present at each time slice (e.g., including actors represented by the groups of points 320B-2, 320B-3, the groups of points 320C-2, 320C-3, and/or the groups of points 320D-3. In addition, the process is not limited to three time slices, and may be performed over any number of time slices depending on the embodiment. For a non-limiting example, where a second in the past and a second into the future are to be included in the trajectory, and the interval of calculation is six times per second, there may be twelve time slices.

Figure 4A:
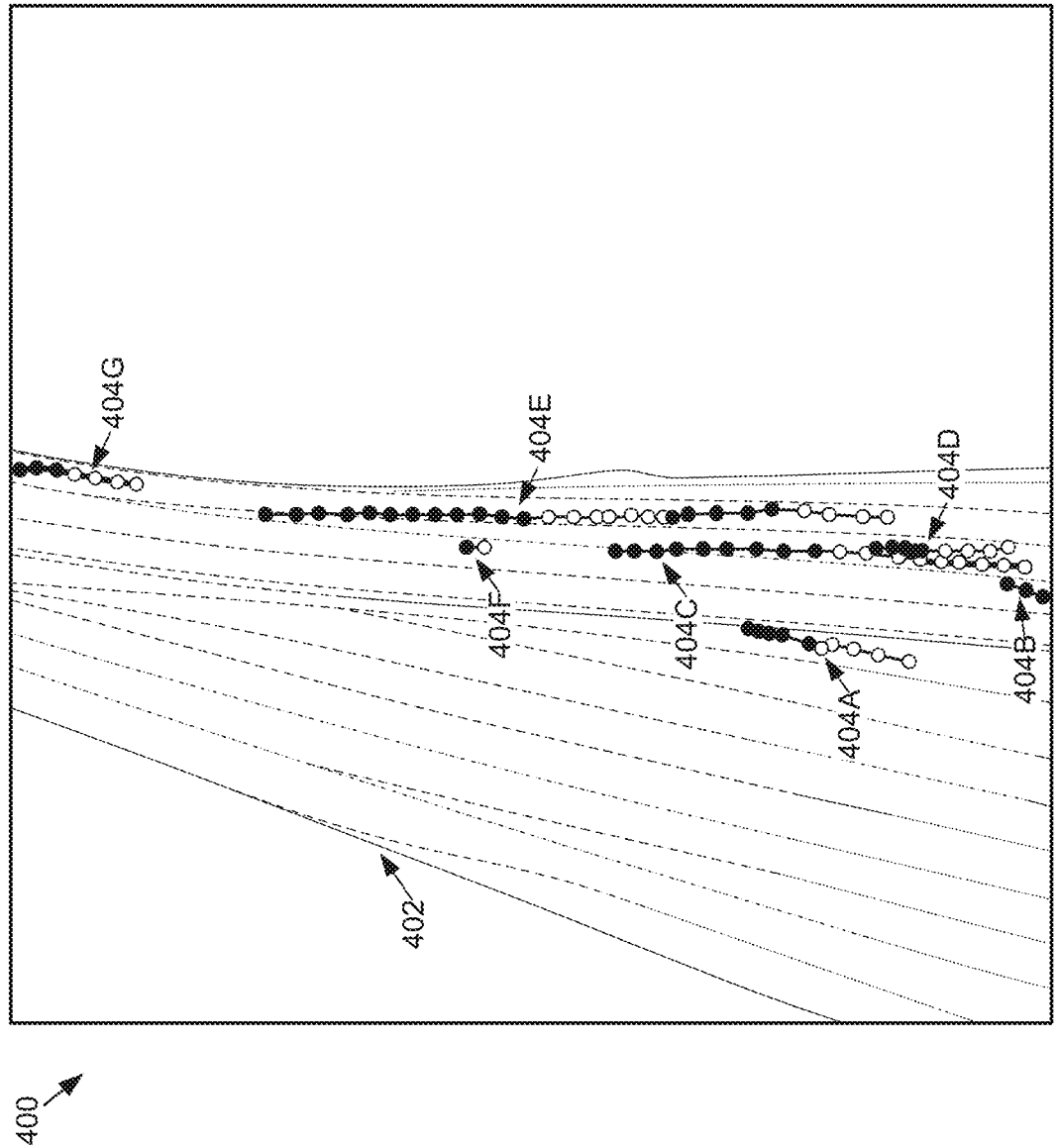
FIG. 4A depicts a visual representation of example trajectories of actors overlaid on a map, in accordance with some embodiments of the present disclosure.

Referring again to FIG. 1A, the trajectory generator 126 may use the outputs of the post-processor 124 to generate a trajectory for each actor that is tracked. As an example, and with reference to FIG. 4A, FIG. 4A depicts a visual representation of example trajectories of actors overlaid on a map, in accordance with some embodiments of the present disclosure. Visualization 400 may include map information as indicated by the lane lines 402 and trajectories 404A-404G for various actors (e.g., trajectory 404A for actor A, trajectory 440B for actor B, and so on). The black dots of the trajectories 404 may indicate future location predictions and the white dots may indicate past locations (e.g., known locations). As such, the trajectory generator 126 may piece together the known past locations and the predicted future locations and generate the trajectories 404, which may be used by a drive stack 128 of the vehicle 600.

Figure 4B:
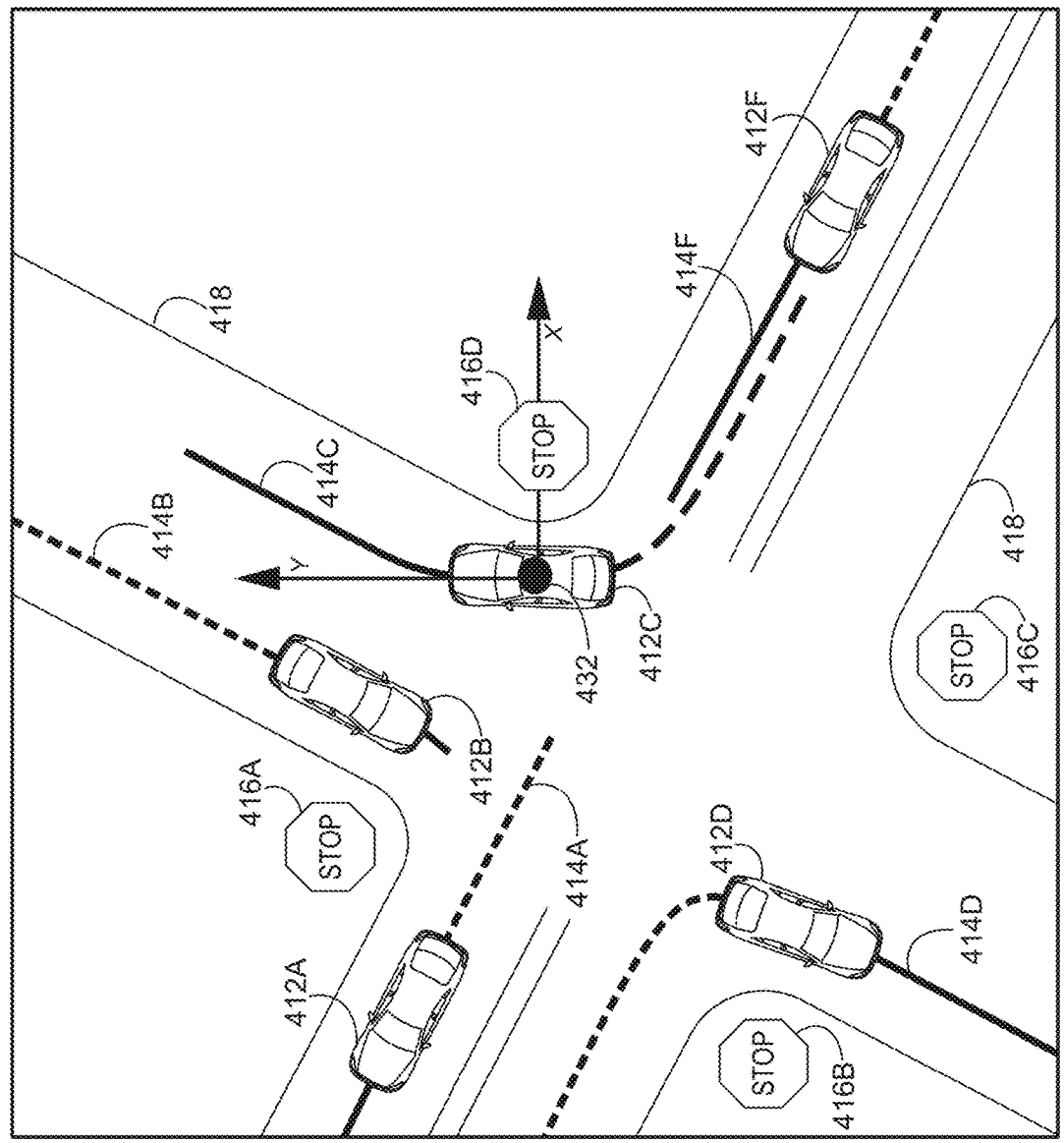
FIG. 4B depicts a visual representation of actors, associated trajectories, wait conditions, and a road structure, in accordance with some embodiments of the present disclosure.

As another example, and with respect to FIG. 4B, FIG. 4B depicts a visual representation of actors, associated trajectories, wait conditions, and a road structure, in accordance with some embodiments of the present disclosure. Visualization 410 may represent information passed to the drive stack 128 of the vehicle 600 after the process 100 has been executed. For example, the visualization 410 may include an abstracted representation of a combination of inputs and outputs of the DNN 116 (e.g., after post-processing). For example, road structure or map information from the HD map 104 may be used to determine road boundaries 418, the wait conditions 114 may be used to determine stop signs 416A-416D are present and their locations, and trajectories 414A-414F for each of the actors 412A-414F, respectively, may be determined based on the outputs of the post-processor 124. In addition, as described herein, the representation may be ego-centered such that the visualization 410 is centered from a perspective of an ego-vehicle (e.g., actor 412C). The dashed lines of the trajectories 414 may represent past known or tracked locations of the actors 412 and the solid lines may represent predicted future locations of the actors 412. The locations of the actors 412 in the representation may represent the locations of the actors at the current time.

Referring again to FIG. 1A, the outputs of the trajectory generator 126 may be transmitted or applied to the drive stack 128 of the vehicle 600. For example, once the trajectories have been computed—and converted from 2D image-space coordinates to 3D world-space coordinates, in embodiments—the trajectories may be used by the autonomous vehicle 600 in performing one or more operations (e.g., obstacle avoidance, lane keeping, lane changing, path planning, mapping, etc.). More specifically, the trajectories may be used by the drive stack 128 of the autonomous vehicle 600, such as an autonomous machine software stack executing on one or more components of the vehicle 600 (e.g., the SoC(s) 604, the CPU(s) 618, the GPU(s) 620, etc.). For example, the vehicle 600 may use this information (e.g., future locations of one or more actors in the environment) to navigate, plan, or otherwise perform one or more operations (e.g., obstacle avoidance, lane keeping, lane changing, path planning, merging, splitting, etc.) within the environment.

In some embodiments, the trajectories may be used by one or more layers of an autonomous machine software stack 128 (alternatively referred to herein as the "drive stack 128"). The drive stack 128 may include a sensor manager (not shown), perception component(s) (e.g., corresponding to a perception layer of the drive stack 128), a world model manager, planning component(s)(e.g., corresponding to a planning layer of the drive stack 128), control component(s) (e.g., corresponding to a control layer of the drive stack 128), obstacle avoidance component(s) (e.g., corresponding to an obstacle or collision avoidance layer of the drive stack 128), actuation component(s) (e.g., corresponding to an actuation layer of the drive stack 128), and/or other components corresponding to additional and/or alternative layers of the drive stack 128. The process 100 may, in some examples, be executed by the perception component(s), which may feed outputs from one or more layers of the drive stack 128 to the world model manager, as described in more detail herein.

The sensor manager may manage and/or abstract the sensor data 102 from the sensors of the vehicle 600. For example, and with reference to FIG. 6C, the sensor data 102 may be generated (e.g., perpetually, at intervals, based on certain conditions) by RADAR sensor(s) 660. The sensor manager may receive the sensor data 102 from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 600 may use the uniform format, thereby simplifying processing of the sensor data 102. In some examples, the sensor manager may use a uniform format to apply control back to the sensors of the vehicle 600, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager may be used to generate, update, and/or define a world model. The world model manager may use information generated by and received from the perception component(s) of the drive stack 128 (e.g., the past and predicted locations of detected actors). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s), control component(s), obstacle avoidance component(s), and/or actuation component(s) of the drive stack 128. The obstacle perceiver may perform obstacle perception that may be based on where the vehicle 600 is allowed to drive or is capable of driving (e.g., based on the location of the drivable paths defined by avoiding detected obstacles), and how fast the vehicle 600 can drive without colliding with an obstacle (e.g., an object, such as a structure, entity, vehicle, etc.) that is sensed by the sensors of the vehicle 600.

The path perceiver may perform path perception, such as by perceiving nominal paths that are available in a particular situation. In some examples, the path perceiver may further take into account lane changes for path perception. A lane graph (e.g., generated using, at least in part, the HD map 104) may represent the path or paths available to the vehicle 600, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 600 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 600 of static or stationary infrastructure objects and obstacles. The map perceiver may also generate information for the wait perceiver and/or the path perceiver, for example, such as to determine which light at an intersection has to be green for the vehicle 600 to take a particular path.

Figure 6A:
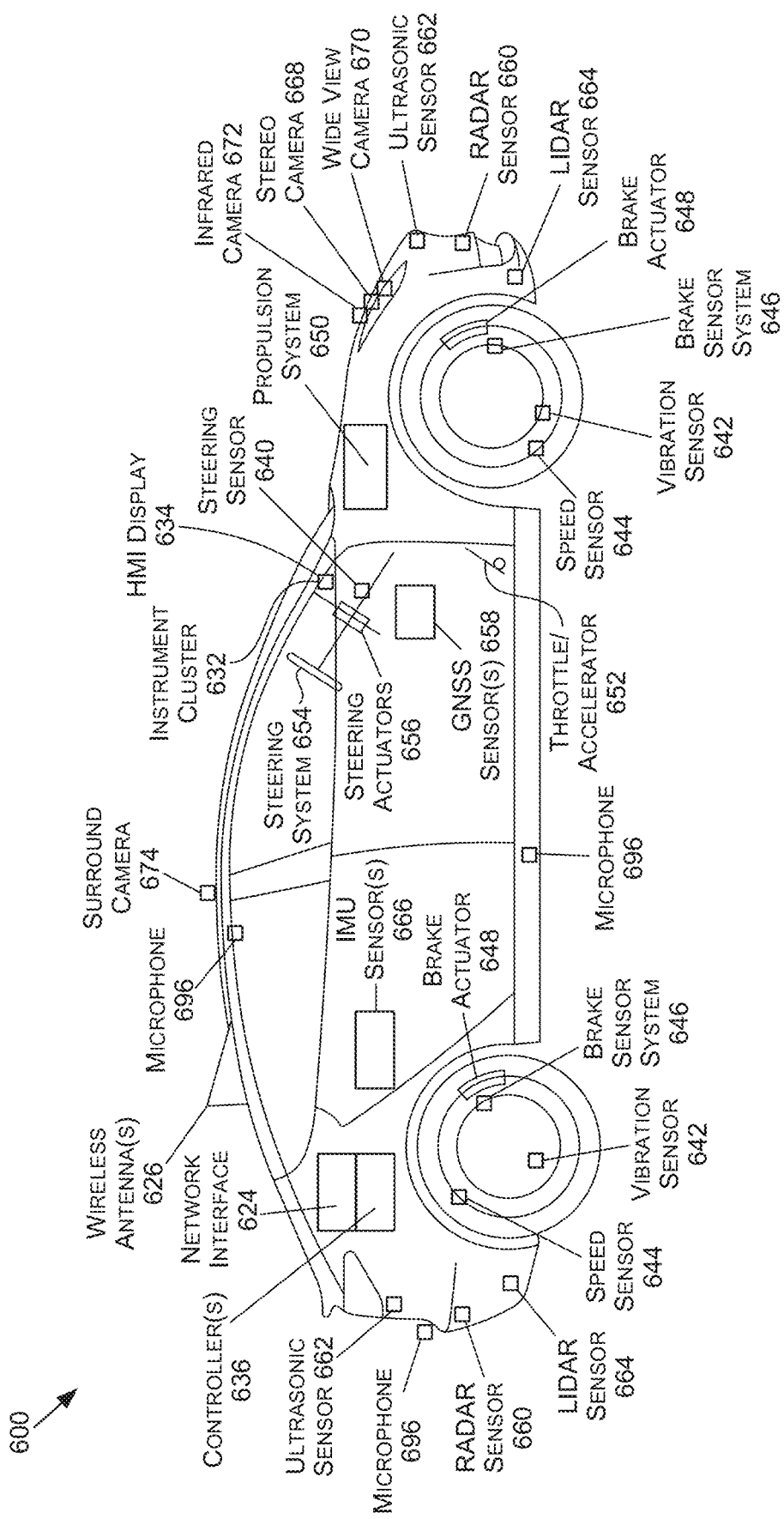
FIG. 6A is an illustration of an example autonomous vehicle, in accordance with some embodiments of the present disclosure.
Figure 6B:
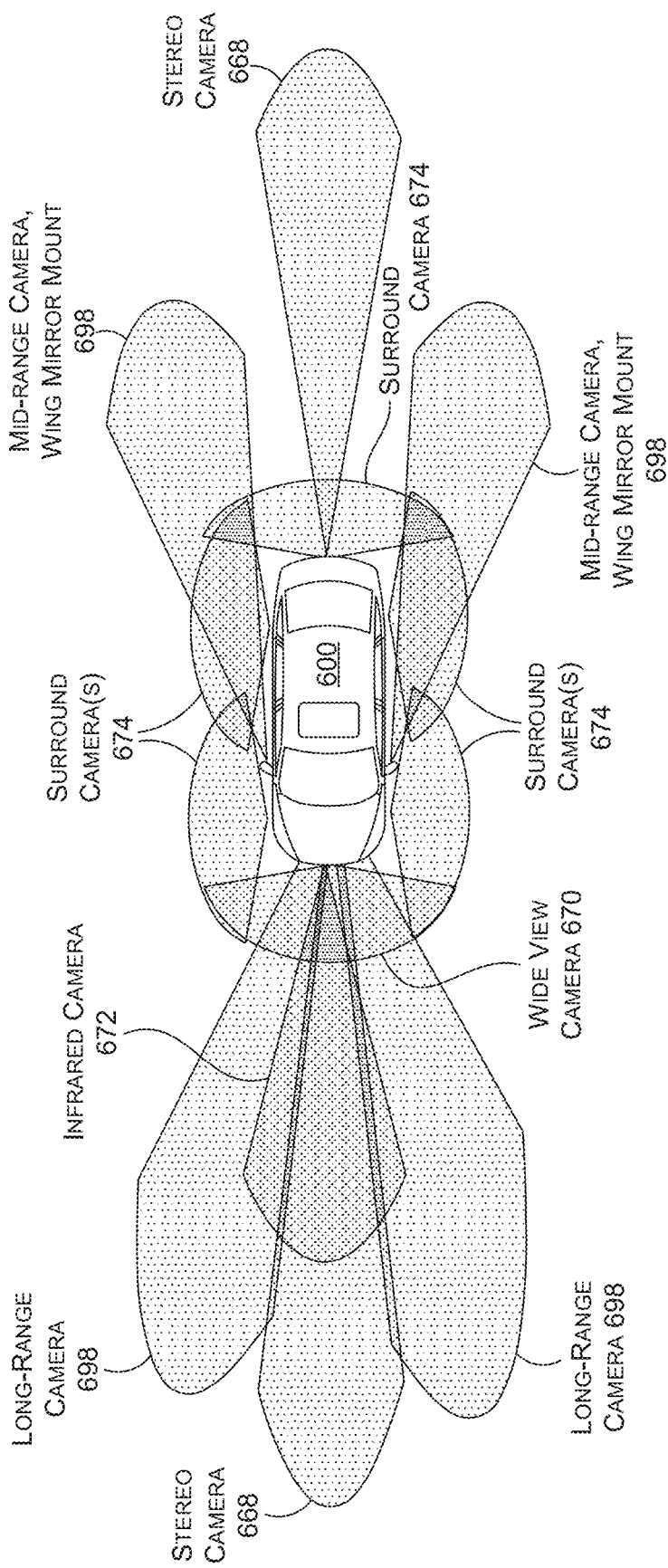
FIG. 6B is an example of camera locations and fields of view for the example autonomous vehicle of FIG. 6A, in accordance with some embodiments of the present disclosure.
Figure 6C:
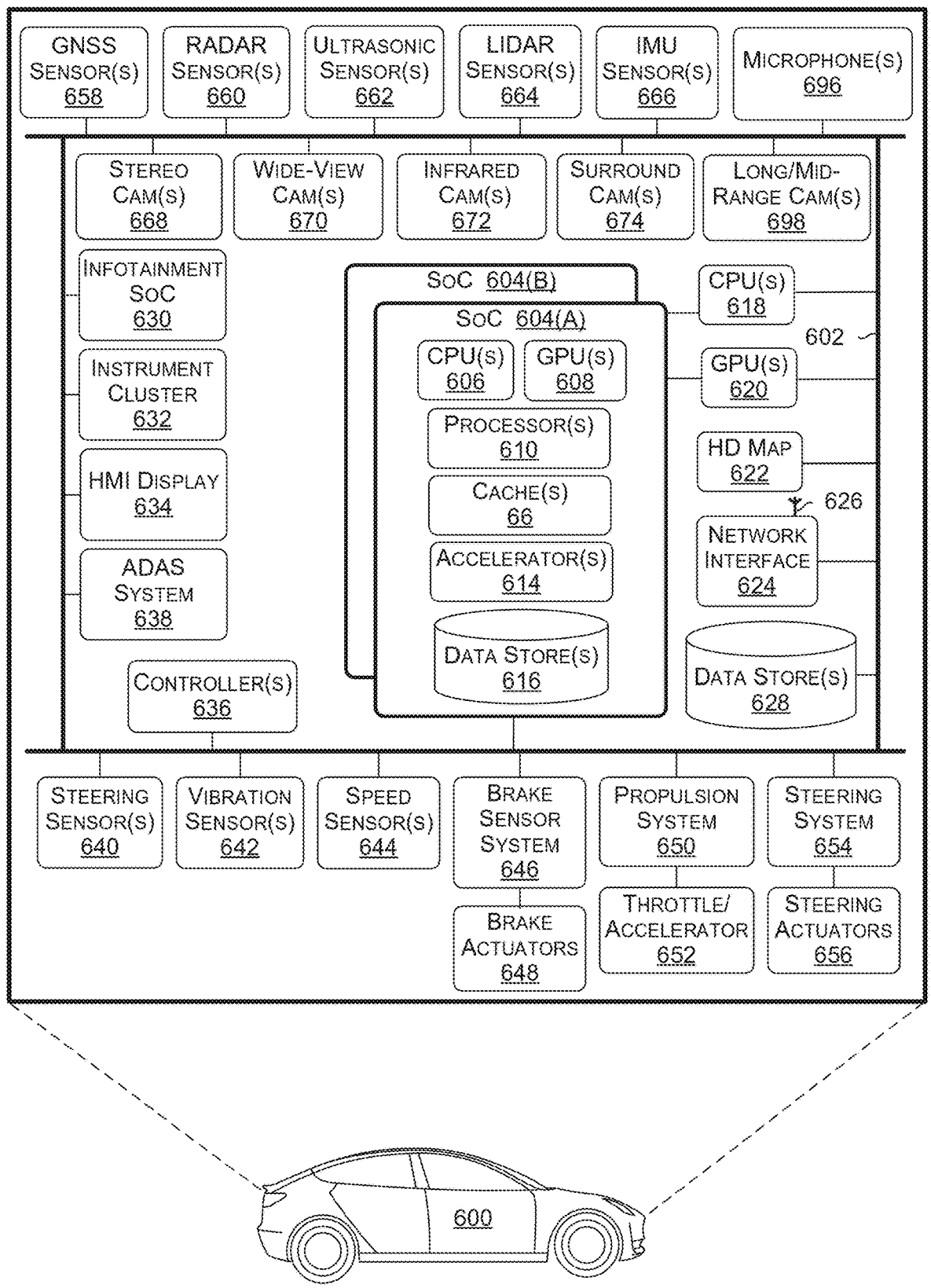
FIG. 6C is a block diagram of an example system architecture for the example autonomous vehicle of FIG. 6A, in accordance with some embodiments of the present disclosure.
Figure 6D:
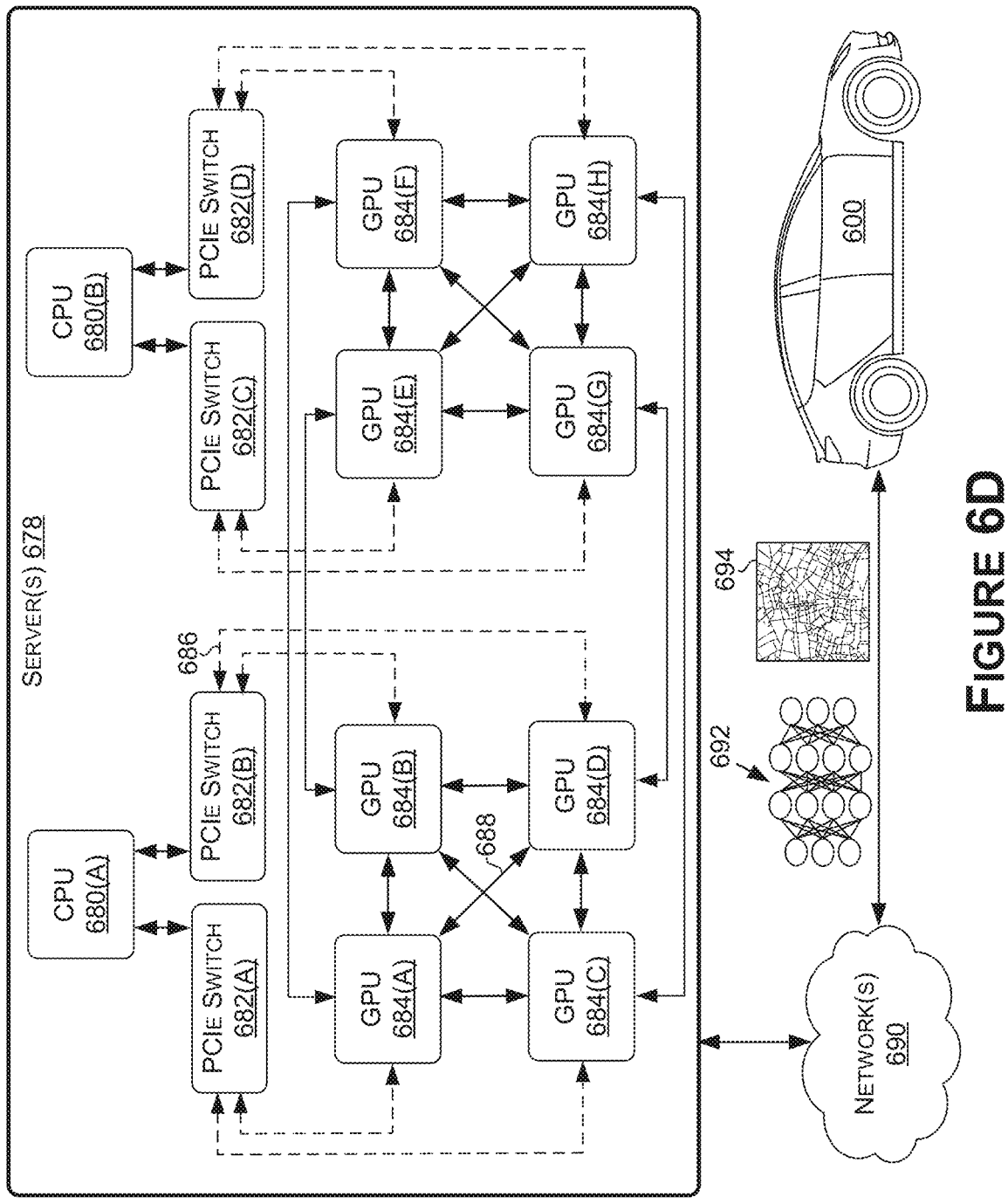
FIG. 6D is a system diagram for communication between cloud-based server(s) and the example autonomous vehicle of FIG. 6A, in accordance with some embodiments of the present disclosure.

In some examples, information from the map perceiver may be sent, transmitted, and/or provided to server(s) (e.g., to a map manager of server(s) 678 of FIG. 6D), and information from the server(s) may be sent, transmitted, and/or provided to the map perceiver and/or a localization manager of the vehicle 600. The map manager may include a cloud mapping application that is remotely located from the vehicle 600 and accessible by the vehicle 600 over one or more network(s). For example, the map perceiver and/or the localization manager of the vehicle 600 may communicate with the map manager and/or one or more other components or features of the server(s) to inform the map perceiver and/or the localization manager of past and present drives or trips of the vehicle 600, as well as past and present drives or trips of other vehicles. The map manager may provide mapping outputs (e.g., map data) that may be localized by the localization manager based on a particular location of the vehicle 600, and the localized mapping outputs may be used by the world model manager to generate and/or update the world model.

The planning component(s) may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 600, etc. The waypoints may be representative of a specific distance into the future for the vehicle 600, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 600, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) may follow a trajectory or path (lateral and longitudinal) that has been received from the behavior selector of the planning component(s) as closely as possible and within the capabilities of the vehicle 600. The control component(s) may use tight feedback to handle unplanned events or behaviors that are not modeled and/or anything that causes discrepancies from the ideal (e.g., unexpected delay). In some examples, the control component(s) may use a forward prediction model that takes control as an input variable, and produces predictions that may be compared with the desired state (e.g., compared with the desired lateral and longitudinal path requested by the planning component(s)). The control(s) that minimize discrepancy may be determined.

The obstacle avoidance component(s) may aid the autonomous vehicle 600 in avoiding collisions with objects (e.g., moving and stationary objects). The obstacle avoidance component(s) may include a computational mechanism at a "primal level" of obstacle avoidance, and may act as a "survival brain" or "reptile brain" for the vehicle 600. In some examples, the obstacle avoidance component(s) may be used independently of components, features, and/or functionality of the vehicle 600 that is required to obey traffic rules and drive courteously. In such examples, the obstacle avoidance component(s) may ignore traffic laws, rules of the road, and courteous driving norms in order to ensure that collisions do not occur between the vehicle 600 and any objects. As such, the obstacle avoidance layer may be a separate layer from the rules of the road layer, and the obstacle avoidance layer may ensure that the vehicle 600 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable paths and/or object detections may be used by the obstacle avoidance component(s) in determining controls or actions to take. For example, the drivable paths may provide an indication to the obstacle avoidance component(s) of where the vehicle 600 may maneuver without striking any objects, structures, and/or the like, or at least where no static structures may exist.

In non-limiting embodiments, the obstacle avoidance component(s) may be implemented as a separate, discrete feature of the vehicle 600. For example, the obstacle avoidance component(s) may operate separately (e.g., in parallel with, prior to, and/or after) the planning layer, the control layer, the actuation layer, and/or other layers of the drive stack 128.

As such, the vehicle 600 may use this information (e.g., as the edges, or rails of the paths) to navigate, plan, or otherwise perform one or more operations (e.g., lane keeping, lane changing, path planning, merging, splitting, etc.) within the environment.

Figure 5:
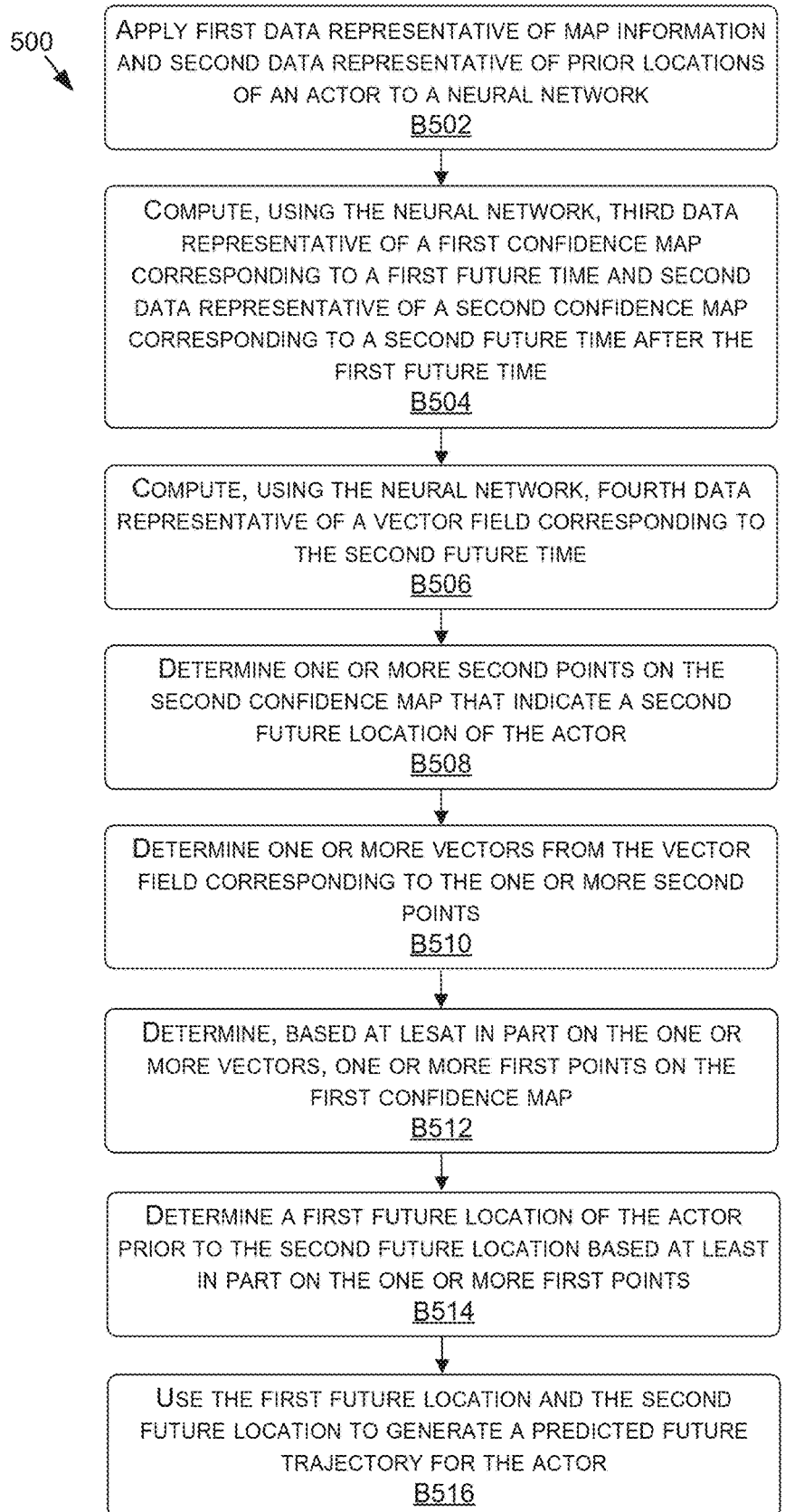
FIG. 5 is a flow diagram showing a method for computing actor trajectories using a DNN, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1A. However, this method 500 may additionally or alternatively be executed by any one system or within any one process, or any combination of systems and processes, including, but not limited to, those described herein.

FIG. 5 is a flow diagram showing a method 500 for computing actor trajectories using a DNN, in accordance with some embodiments of the present disclosure. The method 500, at block B502, includes applying first data representative of map information and second data representative of prior locations of an actor to a neural network. For example, the map information 112, the past location(s) 110, the wait conditions 114, and/or other inputs 108 may be applied to the DNN 116.

The method 500, at block B504, includes computing, using the neural network, third data representative of a first confidence map corresponding to a first future time and second data representative of a second confidence map corresponding to a second future time after the first future time. For example, the DNN 116 may compute a confidence fields 120 corresponding to a first future time slice and a second future time slice after the first future time slice.

The method 500, at block B506, includes computing, using the neural network, fourth data representative of a vector field corresponding to the second future time. For example, the DNN 116 may compute a vector field 122 corresponding to the second future time slice.

The method 500, at block B508, includes determining one or more second points on the second confidence map that indicate a second future location of the actor. For example, the post-processor 124 may perform clustering, weighted averaging, and/or another technique to determine points from the confidence field 120 corresponding to the second future time slice that indicate an actor is present.

The method 500, at block B510, includes determining one or more vectors from the vector field corresponding to the one or more second points. For example, the vectors from the vector field 122 that correspond to the points from the confidence field 120 may be determined.

The method 500, at block B512, includes determining, based at least in part on the one or more vectors, one or more first points on the first confidence map. For example, the vectors may be leveraged to determine potential locations or points on the confidence field 120 corresponding to the first future time slice that indicate the actor is present.

The method 500, at block B514, includes determining a first future location of the actor prior the second future location based at least in part on the one or more first points.

For example, the location or points from the confidence field 120 corresponding to the first future time slice may be leveraged to determine a first future location of the actor.

The method 500, at block B516, includes using the first future location and the second future location to generate a predicted future trajectory for the actor. For example, the trajectory generator 126 may use the predicted locations at the first future time slice and the second future time slice to generate a trajectory. The trajectory may then be used by the drive stack 128 to perform one or more operations, such as but not limited to those described herein.

Training a DNN for Future Trajectory Predictions

With reference to FIGS. 1A-1B, in order to train the DNN 116, a training engine 130 may be employed. The training engine may rely on ground truth data and one or more loss functions to update weights and parameters of the DNN 116. In order to determine the ground truth data, training data may first be collected, and ground truth data corresponding thereto may be generated. In some embodiments, in order to collect and/or generate training data that is most effective for training the DNN 116, event weighting and/or data mining may be executed. For example, any number of recordings— which may be large and collected over long drive times— may be used to generate training datasets for training the DNN 116. Often, the datasets may contain straight-line, constant velocity sections that, if used directly, may skew the DNN 116 toward prediction motion that does not have a fidelity higher than just using kinematics to make such predictions. As a result, sections of the recordings used for the training data that do not represent straight-line, constant velocity traffic may be identified as more interesting or non-trivial. In such example, the non-trivial or more interesting training data (e.g., lane changing, curving roads, cut-ins, aggressive maneuvers, etc.) may be weighted within the loss function(s) more heavily than more trivial or less interesting (e.g., straight-line, constant velocity, etc.). A triviality or relevance/importance factor may be associated to each training data instance, and this factor may be used to determine the weighting with respect to the loss function(s) for the respective training data instance. In some embodiments, active learning may be used to enable the DNN 116 to increase its predictive power in the non-trivial and more interesting, relevant, and/or important scenarios using one or more markers.

The markers may be determined using, in some embodiments, a statistical approach. Although, in other embodiments, heuristics, machine learning, and/or other techniques may be implemented to determine the markers. Where a statistical approach is used, various measurements may be computed to determine a triviality factor for an instance of training data. For example, and without limitation, a standard deviation of velocities, a ratio of standard deviation in longitudinal (Y) and lateral (X) directions, and/or a change in standard deviation of velocities may represent markers that perform well in identifying non-trivial training data instances. Larger standard deviations tend to occur in X and Y directions at intersections purporting non-trivial motion of traffic. Larger ratios of standard deviations of lateral to longitudinal directions tend to indicate cut-ins, and other urban driving scenarios. In addition, a change in standard deviations over the course of a training dataset (e.g., 3-6 seconds) may generally indicate a congested traffic scenario.

In addition, in some embodiments, the outputs of an automatic label generation pipeline may be leveraged to detect the occurrence of rare or non-trivial events—such as a vehicle cutting in front of the ego-vehicle 600. The automatic label generation pipeline may include generating training data using one or more components of the drive stack 128 in one or more data collection vehicles as the vehicles traverse various environments. For example, the sensors of the data collection vehicles may be calibrated (e.g., by running self-calibration) to ensure accurate conversions between each of the sensors tracking motion of the ego-vehicle and other actors in the environment. The calibration values may be used by a perception stack—e.g., a component of the drive stack 128—to automatically generate labels for training data for the DNN 116. As such, as the data tracking vehicles move through the environment, the data collected may indicate locations of actors over time. For example, at time, $T_1$, an actor may be detected, and in order to train the DNN 116 to predict a future locations of actors, the motion of the actor may be tracked after time, $T_1$, up until some later time, $T_2$. As such, the locations of the actor from time $T_1$ until time $T_2$ may be used as ground truth data for training the DNN 116 to predict future locations of the actor. In such an example, were the training data applied to the DNN 116 during training to include the locations of the actor over a period of time leading up to time $T_1$, the predictions of the DNN 116 may be compared—using one or more loss functions—to the ground truth data that was automatically generated by the pipeline. This process may be repeated for any number of iterations over any number of training data instances until the accuracy of the DNN 116 converges to an acceptable accuracy. Although this automatic label generation pipeline may be compute-intensive, the burden may be reduced as many of the processes may be run in parallel using one or more GPUs.

As described above, the output of the pipeline may be used to detect rare occurrences. For example, the outputs from the perception stack used by the data collection vehicles and/or on the data collected from the data collection vehicles may represent the world model (e.g., a state of static and dynamic actors or elements in the environment). Using heuristics, statistical models, and/or DNNs, these rare events may be mined in order to build datasets. For example, datasets corresponding to specific maneuvers may be built. As an example, with respect to cut-ins, a heuristic may be used that defines rules such as (1) if the identification (ID) of the current vehicle in path (CVIP) changes; and (2) the distance to the new CVIP is less than 80 meters, flag this instance as a potential cut-in. This process may then be repeated across any number of training data instances to identify the rare or non-trivial events. Once the rare or non-trivial events are identified, they may be sent to labelers for validation (e.g., validate whether this is a cut-in or not). As the DNN 116 is trained to identify such events, these heuristics may be replaced or augmented with the DNN 116 to reduce false positive and false negative rates.

Once the training data and the ground truth are generated, collected, and/or received, the DNN 116 may be trained using the loss function(s). In some examples, a single loss function may be used, while in other examples more than one loss function may be used. Where more than one loss function is used, a first loss function may be used to train the DNN 116 to more accurately predict the confidence fields 120, a second loss function may be used to train the DNN 116 to more accurately predict the vector fields 122, and/or a third loss function may be used to determine a total loss from the first loss function and the second loss function—e.g., using weighting. In such an example, the loss function for the confidence fields 120 may include a binary cross entropy loss function, and may be defined according to equation (5), below:

$$H(p,y)=-\Sigma_i y_i \log(p_i) \tag{5}$$

The loss function for the vector fields 122 may include an L1 or L2 norm loss function, and may be defined according to equation (2), below:

$$R(v,t)=\|v-t\|_2^2 \tag{6}$$

A total loss function may be computed as a sum of the first loss (equation (5)) and the second loss (equation (6)), weighted according to equation (7), below:

$$L=\alpha H(p,y)+\beta R(v,t) \tag{7}$$

where $\alpha$ and $\beta$ are scalar loss weights, and may be chosen empirically.

Example Autonomous Vehicle

FIG. 6A is an illustration of an example autonomous vehicle 600, in accordance with some embodiments of the present disclosure. The autonomous vehicle 600 (alternatively referred to herein as the "vehicle 600") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 600 may be capable of functionality in accordance with one or more of Level 3-Level 5 of the autonomous driving levels. For example, the vehicle 600 may be capable of conditional automation (Level 3), high automation (Level 4), and/or full automation (Level 5), depending on the embodiment.

The vehicle 600 may include components such as a chassis, a vehicle body, wheels (e.g., 2, 4, 6, 8, 18, etc.), tires, axles, and other components of a vehicle. The vehicle 600 may include a propulsion system 650, such as an internal combustion engine, hybrid electric power plant, an all-electric engine, and/or another propulsion system type. The propulsion system 650 may be connected to a drive train of the vehicle 600, which may include a transmission, to enable the propulsion of the vehicle 600. The propulsion system 650 may be controlled in response to receiving signals from the throttle/accelerator 652.

A steering system 654, which may include a steering wheel, may be used to steer the vehicle 600 (e.g., along a desired path or route) when the propulsion system 650 is operating (e.g., when the vehicle is in motion). The steering system 654 may receive signals from a steering actuator 656. The steering wheel may be optional for full automation (Level 5) functionality.

The brake sensor system 646 may be used to operate the vehicle brakes in response to receiving signals from the brake actuators 648 and/or brake sensors.

Controller(s) 636, which may include one or more system on chips (SoCs) 604 (FIG. 6C) and/or GPU(s), may provide signals (e.g., representative of commands) to one or more components and/or systems of the vehicle 600. For example, the controller(s) may send signals to operate the vehicle brakes via one or more brake actuators 648, to operate the steering system 654 via one or more steering actuators 656, to operate the propulsion system 650 via one or more throttle/accelerators 652. The controller(s) 636 may include one or more onboard (e.g., integrated) computing devices (e.g., supercomputers) that process sensor signals, and output operation commands (e.g., signals representing commands) to enable autonomous driving and/or to assist a human driver in driving the vehicle 600. The controller(s) 636 may include a first controller 636 for autonomous driving functions, a second controller 636 for functional safety functions, a third controller 636 for artificial intelligence functionality (e.g., computer vision), a fourth controller 636 for infotainment functionality, a fifth controller 636 for redundancy in emergency conditions, and/or other controllers. In some examples, a single controller 636 may handle two or more of the above functionalities, two or more controllers 636 may handle a single functionality, and/or any combination thereof.

The controller(s) 636 may provide the signals for controlling one or more components and/or systems of the vehicle 600 in response to sensor data received from one or more sensors (e.g., sensor inputs). The sensor data may be received from, for example and without limitation, global navigation satellite systems sensor(s) 658 (e.g., Global Positioning System sensor(s)), RADAR sensor(s) 660, ultrasonic sensor(s) 662, LIDAR sensor(s) 664, inertial measurement unit (IMU) sensor(s) 666 (e.g., accelerometer(s), gyroscope(s), magnetic compass(es), magnetometer(s), etc.), microphone(s) 696, stereo camera(s) 668, wide-view camera(s) 670 (e.g., fisheye cameras), infrared camera(s) 672, surround camera(s) 674 (e.g., 360 degree cameras), long-range and/or mid-range camera(s) 698, speed sensor(s) 644 (e.g., for measuring the speed of the vehicle 600), vibration sensor(s) 642, steering sensor(s) 640, brake sensor(s) (e.g., as part of the brake sensor system 646), and/or other sensor types.

One or more of the controller(s) 636 may receive inputs (e.g., represented by input data) from an instrument cluster 632 of the vehicle 600 and provide outputs (e.g., represented by output data, display data, etc.) via a human-machine interface (HMI) display 634, an audible annunciator, a loudspeaker, and/or via other components of the vehicle 600. The outputs may include information such as vehicle velocity, speed, time, map data (e.g., the HD map 622 of FIG. 6C), location data (e.g., the vehicle's 600 location, such as on a map), direction, location of other vehicles (e.g., an occupancy grid), information about objects and status of objects as perceived by the controller(s) 636, etc. For example, the HMI display 634 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 600 further includes a network interface 624 which may use one or more wireless antenna(s) 626 and/or modem(s) to communicate over one or more networks. For example, the network interface 624 may be capable of communication over LTE, WCDMA, UMTS, GSM, CDMA2000, etc. The wireless antenna(s) 626 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 6B is an example of camera locations and fields of view for the example autonomous vehicle 600 of FIG. 6A, in accordance with some embodiments of the present disclosure. The cameras and respective fields of view are one example embodiment and are not intended to be limiting. For example, additional and/or alternative cameras may be included and/or the cameras may be located at different locations on the vehicle 600.

The camera types for the cameras may include, but are not limited to, digital cameras that may be adapted for use with the components and/or systems of the vehicle 600. The camera(s) may operate at automotive safety integrity level (ASIL) B and/or at another ASIL. The camera types may be capable of any image capture rate, such as 60 frames per second (fps), 620 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 600 (e.g., front-facing cameras) may be used for surround view, to help identify forward facing paths and obstacles, as well aid in, with the help of one or more controllers 636 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 670 that may be used to perceive objects coming into view from the periphery (e.g., pedestrians, crossing traffic or bicycles). Although only one wide-view camera is illustrated in FIG. 6B, there may any number of wide-view cameras 670 on the vehicle 600. In addition, long-range camera(s) 698 (e.g., a long-view stereo camera pair) may be used for depth-based object detection, especially for objects for which a neural network has not yet been trained. The long-range camera(s) 698 may also be used for object detection and classification, as well as basic object tracking.

One or more stereo cameras 668 may also be included in a front-facing configuration. The stereo camera(s) 668 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 668 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 668 may be used in addition to, or alternatively from, those described herein.

Cameras with a field of view that include portions of the environment to the side of the vehicle 600 (e.g., side-view cameras) may be used for surround view, providing information used to create and update the occupancy grid, as well as to generate side impact collision warnings. For example, surround camera(s) 674 (e.g., four surround cameras 674 as illustrated in FIG. 6B) may be positioned to on the vehicle 600. The surround camera(s) 674 may include wide-view camera(s) 670, fisheye camera(s), 360 degree camera(s), and/or the like. Four example, four fisheye cameras may be positioned on the vehicle's front, rear, and sides. In an alternative arrangement, the vehicle may use three surround camera(s) 674 (e.g., left, right, and rear), and may leverage one or more other camera(s) (e.g., a forward-facing camera) as a fourth surround view camera.

Cameras with a field of view that include portions of the environment to the rear of the vehicle 600 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 698, stereo camera(s) 668), infrared camera(s) 672, etc.), as described herein.

FIG. 6C is a block diagram of an example system architecture for the example autonomous vehicle 600 of FIG. 6A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 600 in FIG. 6C are illustrated as being connected via bus 602. The bus 602 may include a Controller Area Network (CAN) data interface (alternatively referred to herein as a "CAN bus"). A CAN may be a network inside the vehicle 600 used to aid in control of various features and functionality of the vehicle 600, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 602 is described herein as being a CAN bus, this is not intended to be limiting. For example, in addition to, or alternatively from, the CAN bus, FlexRay and/or Ethernet may be used. Additionally, although a single line is used to represent the bus 602, this is not intended to be limiting. For example, there may be any number of busses 602, which may include one or more CAN busses, one or more FlexRay busses, one or more Ethernet busses, and/or one or more other types of busses using a different protocol. In some examples, two or more busses 602 may be used to perform different functions, and/or may be used for redundancy. For example, a first bus 602 may be used for collision avoidance functionality and a second bus 602 may be used for actuation control. In any example, each bus 602 may communicate with any of the components of the vehicle 600, and two or more busses 602 may communicate with the same components. In some examples, each SoC 604, each controller 636, and/or each computer within the vehicle may have access to the same input data (e.g., inputs from sensors of the vehicle 600), and may be connected to a common bus, such the CAN bus.

The vehicle 600 may include one or more controller(s) 636, such as those described herein with respect to FIG. 6A. The controller(s) 636 may be used for a variety of functions. The controller(s) 636 may be coupled to any of the various other components and systems of the vehicle 600, and may be used for control of the vehicle 600, artificial intelligence of the vehicle 600, infotainment for the vehicle 600, and/or the like.

The vehicle 600 may include a system(s) on a chip (SoC) 604. The SoC 604 may include CPU(s) 606, GPU(s) 608, processor(s) 610, cache(s) 612, accelerator(s) 614, data store(s) 616, and/or other components and features not illustrated. The SoC(s) 604 may be used to control the vehicle 600 in a variety of platforms and systems. For example, the SoC(s) 604 may be combined in a system (e.g., the system of the vehicle 600) with an H D map 622 which may obtain map refreshes and/or updates via a network interface 624 from one or more servers (e.g., server(s) 678 of FIG. 6D).

The CPU(s) 606 may include a CPU cluster or CPU complex (alternatively referred to herein as a "CCPLEX"). The CPU(s) 606 may include multiple cores and/or L2 caches. For example, in some embodiments, the CPU(s) 606 may include eight cores in a coherent multi-processor configuration. In some embodiments, the CPU(s) 606 may include four dual-core clusters where each cluster has a dedicated L2 cache (e.g., a 2 MB L2 cache). The CPU(s) 606 (e.g., the CCPLEX) may be configured to support simultaneous cluster operation enabling any combination of the clusters of the CPU(s) 606 to be active at any given time.

The CPU(s) 606 may implement power management capabilities that include one or more of the following features: individual hardware blocks may be clock-gated automatically when idle to save dynamic power, each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 606 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 608 may include an integrated GPU (alternatively referred to herein as an "iGPU"). The GPU(s) 608 may be programmable and may be efficient for parallel workloads. The GPU(s) 608, in some examples, may use an enhanced tensor instruction set. The GPU(s) 608 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 608 may include at least eight streaming microprocessors. The GPU(s) 608 may use compute application programming interface(s) (API(s)). In addition, the GPU(s) 608 may use one or more parallel computing platforms and/or programming models (e.g., NVIDIA's CUDA).

The GPU(s) 608 may be power-optimized for best performance in automotive and embedded use cases. For example, the GPU(s) 608 may be fabricated on a Fin field-effect transistor (FinFET). However, this is not intended to be limiting and the GPU(s) 608 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 608 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 608 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 608 to access the CPU(s) 606 page tables directly. In such examples, when the GPU(s) 608 memory management unit (MMU) experiences a miss, an address translation request may be transmitted to the CPU(s) 606. In response, the CPU(s) 606 may look in its page tables for the virtual-to-physical mapping for the address and transmits the translation back to the GPU(s) 608. As such, unified memory technology may allow a single unified virtual address space for memory of both the CPU(s) 606 and the GPU(s) 608, thereby simplifying the GPU(s) 608 programming and porting of applications to the GPU(s) 608.

In addition, the GPU(s) 608 may include an access counter that may keep track of the frequency of access of the GPU(s) 608 to memory of other processors. The access counter may help ensure that memory pages are moved to the physical memory of the processor that is accessing the pages most frequently.

The SoC(s) 604 may include any number of cache(s) 612, including those described herein. For example, the cache(s) 612 may include an L3 cache that is available to both the CPU(s) 606 and the GPU(s) 608 (e.g., that is connected both the CPU(s) 606 and the GPU(s) 608). The cache(s) 612 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 604 may include one or more accelerators 614 (e.g., hardware accelerators, software accelerators, or a combination thereof). For example, the SoC(s) 604 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 608 and to off-load some of the tasks of the GPU(s) 608 (e.g., to free up more cycles of the GPU(s) 608 for performing other tasks). As an example, the accelerator(s) 614 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 614 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 608, and by using an inference accelerator, for example, a designer may target either the DLA(s) or the GPU(s) 608 for any function. For example, the designer may focus processing of CNNs and floating point operations on the DLA(s) and leave other functions to the GPU(s) 608 and/or other accelerator(s) 614.

The accelerator(s) 614 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 606. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 614 (e.g., the hardware acceleration cluster) may include a computer vision network on-chip and SRAM, for providing a high-bandwidth, low latency SRAM for the accelerator(s) 614. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 604 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 614 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 666 output that correlates with the vehicle 600 orientation, distance, 3D location estimates of the object obtained from the neural network and/or other sensors (e.g., LIDAR sensor(s) 664 or RADAR sensor(s) 660), among others.

The SoC(s) 604 may include data store(s) 616 (e.g., memory). The data store(s) 616 may be on-chip memory of the SoC(s) 604, which may store neural networks to be executed on the GPU and/or the DLA. In some examples, the data store(s) 616 may be large enough in capacity to store multiple instances of neural networks for redundancy and safety. The data store(s) 612 may comprise L2 or L3 cache(s) 612. Reference to the data store(s) 616 may include reference to the memory associated with the PVA, DLA, and/or other accelerator(s) 614, as described herein.

The SoC(s) 604 may include one or more processor(s) 610 (e.g., embedded processors). The processor(s) 610 may include a boot and power management processor that may be a dedicated processor and subsystem to handle boot power and management functions and related security enforcement. The boot and power management processor may be a part of the SoC(s) 604 boot sequence and may provide runtime power management services. The boot power and management processor may provide clock and voltage programming, assistance in system low power state transitions, management of SoC(s) 604 thermals and temperature sensors, and/or management of the SoC(s) 604 power states. Each temperature sensor may be implemented as a ring-oscillator whose output frequency is proportional to temperature, and the SoC(s) 604 may use the ring-oscillators to detect temperatures of the CPU(s) 606, GPU(s) 608, and/or accelerator(s) 614. If temperatures are determined to exceed a threshold, the boot and power management processor may enter a temperature fault routine and put the SoC(s) 604 into a lower power state and/or put the vehicle 600 into a chauffeur to safe stop mode (e.g., bring the vehicle 600 to a safe stop).

The processor(s) 610 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 610 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 610 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 610 may further include a real-time camera engine that may include a dedicated processor subsystem for handling real-time camera management.

The processor(s) 610 may further include a high-dynamic range signal processor that may include an image signal processor that is a hardware engine that is part of the camera processing pipeline.

The processor(s) 610 may include a video image compositor that may be a processing block (e.g., implemented on a microprocessor) that implements video post-processing functions needed by a video playback application to produce the final image for the player window. The video image compositor may perform lens distortion correction on wide-view camera(s) 670, surround camera(s) 674, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 608 is not required to continuously render new surfaces. Even when the GPU(s) 608 is powered on and active doing 3D rendering, the video image compositor may be used to offload the GPU(s) 608 to improve performance and responsiveness.

The SoC(s) 604 may further include a mobile industry processor interface (MIPI) camera serial interface for receiving video and input from cameras, a high-speed interface, and/or a video input block that may be used for camera and related pixel input functions. The SoC(s) 604 may further include an input/output controller(s) that may be controlled by software and may be used for receiving I/O signals that are uncommitted to a specific role.

The SoC(s) 604 may further include a broad range of peripheral interfaces to enable communication with peripherals, audio codecs, power management, and/or other devices. The SoC(s) 604 may be used to process data from cameras (e.g., connected over Gigabit Multimedia Serial Link and Ethernet), sensors (e.g., LIDAR sensor(s) 664, RADAR sensor(s) 660, etc. that may be connected over Ethernet), data from bus 602 (e.g., speed of vehicle 600, steering wheel position, etc.), data from GNSS sensor(s) 658 (e.g., connected over Ethernet or CAN bus). The SoC(s) 604 may further include dedicated high-performance mass storage controllers that may include their own DMA engines, and that may be used to free the CPU(s) 606 from routine data management tasks.

The SoC(s) 604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving or machine software stack, along with deep learning tools. The SoC(s) 604 may be faster, more reliable, and even more energy-efficient and space-efficient than conventional systems. For example, the accelerator(s) 614, when combined with the CPU(s) 606, the GPU(s) 608, and the data store(s) 616, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 620) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 608.

In some examples, a CNN for facial recognition and vehicle owner identification may use data from camera sensors to identify the presence of an authorized driver and/or owner of the vehicle 600. The always on sensor processing engine may be used to unlock the vehicle when the owner approaches the driver door and turn on the lights, and, in security mode, to disable the vehicle when the owner leaves the vehicle. In this way, the SoC(s) 604 provide for security against theft and/or carjacking.

In another example, a CNN for emergency vehicle detection and identification may use data from microphones 696 to detect and identify emergency vehicle sirens. In contrast to conventional systems, that use general classifiers to detect sirens and manually extract features, the SoC(s) 604 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 658. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 662, until the emergency vehicle(s) passes.

The vehicle may include a CPU(s) 618 (e.g., discrete CPU(s), or dCPU(s)), that may be coupled to the SoC(s) 604 via a high-speed interconnect (e.g., PCIe). The CPU(s) 618 may include an X86 processor, for example. The CPU(s) 618 may be used to perform any of a variety of functions, including arbitrating potentially inconsistent results between ADAS sensors and the SoC(s) 604, and/or monitoring the status and health of the controller(s) 636 and/or infotainment SoC 630, for example.

The vehicle 600 may include a GPU(s) 620 (e.g., discrete GPU(s), or dGPU(s)), that may be coupled to the SoC(s) 604 via a high-speed interconnect (e.g., NVIDIA's NVLINK). The GPU(s) 620 may provide additional artificial intelligence functionality, such as by executing redundant and/or different neural networks, and may be used to train and/or update neural networks based on input (e.g., sensor data) from sensors of the vehicle 600.

The vehicle 600 may further include the network interface 624 which may include one or more wireless antennas 626 (e.g., one or more wireless antennas for different communication protocols, such as a cellular antenna, a Bluetooth antenna, etc.). The network interface 624 may be used to enable wireless connectivity over the Internet with the cloud (e.g., with the server(s) 678 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 600 information about vehicles in proximity to the vehicle 600 (e.g., vehicles in front of, on the side of, and/or behind the vehicle 600). This functionality may be part of a cooperative adaptive cruise control functionality of the vehicle 600.

The network interface 624 may include a SoC that provides modulation and demodulation functionality and enables the controller(s) 636 to communicate over wireless networks. The network interface 624 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 600 may further include data store(s) 628 which may include off-chip (e.g., off the SoC(s) 604) storage. The data store(s) 628 may include one or more storage elements including RAM, SRAM, DRAM, VRAM, Flash, hard disks, and/or other components and/or devices that may store at least one bit of data.

The vehicle 600 may further include GNSS sensor(s) 658. The GNSS sensor(s) 658 (e.g., GPS and/or assisted GPS sensors), to assist in mapping, perception, occupancy grid generation, and/or path planning functions. Any number of GNSS sensor(s) 658 may be used, including, for example and without limitation, a GPS using a USB connector with an Ethernet to Serial (RS-232) bridge.

The vehicle 600 may further include RADAR sensor(s) 660. The RADAR sensor(s) 660 may be used by the vehicle 600 for long-range vehicle detection, even in darkness and/or severe weather conditions. RADAR functional safety levels may be ASIL B. The RADAR sensor(s) 660 may use the CAN and/or the bus 602 (e.g., to transmit data generated by the RADAR sensor(s) 660) for control and to access object tracking data, with access to Ethernet to access raw data in some examples. A wide variety of RADAR sensor types may be used. For example, and without limitation, the RADAR sensor(s) 660 may be suitable for front, rear, and side RADAR use. In some example, Pulse Doppler RADAR sensor(s) are used.

The RADAR sensor(s) 660 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 660 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and Flex Ray interface. In an example with six antennae, the central four antennae may create a focused beam pattern, designed to record the vehicle's 600 surroundings at higher speeds with minimal interference from traffic in adjacent lanes. The other two antennae may expand the field of view, making it possible to quickly detect vehicles entering or leaving the vehicle's 600 lane.

Mid-range RADAR systems may include, as an example, a range of up to 660 m (front) or 80 m (rear), and a field of view of up to 42 degrees (front) or 650 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 600 may further include ultrasonic sensor(s) 662. The ultrasonic sensor(s) 662, which may be positioned at the front, back, and/or the sides of the vehicle 600, may be used for park assist and/or to create and update an occupancy grid. A wide variety of ultrasonic sensor(s) 662 may be used, and different ultrasonic sensor(s) 662 may be used for different ranges of detection (e.g., 2.5 m, 4 m). The ultrasonic sensor(s) 662 may operate at functional safety levels of ASIL B.

The vehicle 600 may include LIDAR sensor(s) 664. The LIDAR sensor(s) 664 may be used for object and pedestrian detection, emergency braking, collision avoidance, and/or other functions. The LIDAR sensor(s) 664 may be functional safety level ASIL B. In some examples, the vehicle 600 may include multiple LIDAR sensors 664 (e.g., two, four, six, etc.) that may use Ethernet (e.g., to provide data to a Gigabit Ethernet switch).

In some examples, the LIDAR sensor(s) 664 may be capable of providing a list of objects and their distances for a 360-degree field of view. Commercially available LIDAR sensor(s) 664 may have an advertised range of approximately 600 m, with an accuracy of 2 cm-3 cm, and with support for a 600 Mbps Ethernet connection, for example. In some examples, one or more non-protruding LIDAR sensors 664 may be used. In such examples, the LIDAR sensor(s) 664 may be implemented as a small device that may be embedded into the front, rear, sides, and/or corners of the vehicle 600. The LIDAR sensor(s) 664, in such examples, may provide up to a 620-degree horizontal and 35-degree vertical field-of-view, with a 200 m range even for low-reflectivity objects. Front-mounted LIDAR sensor(s) 664 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 600. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe)

laser pulse per frame and may capture the reflected laser light in the form of 3D range point clouds and co-registered intensity data. By using flash LIDAR, and because flash LIDAR is a solid-state device with no moving parts, the LIDAR sensor(s) 664 may be less susceptible to motion blur, vibration, and/or shock.

The vehicle may further include IMU sensor(s) 666. The IMU sensor(s) 666 may be located at a center of the rear axle of the vehicle 600, in some examples. The IMU sensor(s) 666 may include, for example and without limitation, an accelerometer(s), a magnetometer(s), a gyroscope(s), a magnetic compass(es), and/or other sensor types. In some examples, such as in six-axis applications, the IMU sensor(s) 666 may include accelerometers and gyroscopes, while in nine-axis applications, the IMU sensor(s) 666 may include accelerometers, gyroscopes, and magnetometers.

In some embodiments, the IMU sensor(s) 666 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 666 may enable the vehicle 600 to estimate heading without requiring input from a magnetic sensor by directly observing and correlating the changes in velocity from GPS to the IMU sensor(s) 666. In some examples, the IMU sensor(s) 666 and the GNSS sensor(s) 658 may be combined in a single integrated unit.

The vehicle may include microphone(s) 696 placed in and/or around the vehicle 600. The microphone(s) 696 may be used for emergency vehicle detection and identification, among other things.

The vehicle may further include any number of camera types, including stereo camera(s) 668, wide-view camera(s) 670, infrared camera(s) 672, surround camera(s) 674, long-range and/or mid-range camera(s) 698, and/or other camera types. The cameras may be used to capture image data around an entire periphery of the vehicle 600. The types of cameras used depends on the embodiments and requirements for the vehicle 600, and any combination of camera types may be used to provide the necessary coverage around the vehicle 600. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 6A and FIG. 6B.

The vehicle 600 may further include vibration sensor(s) 642. The vibration sensor(s) 642 may measure vibrations of components of the vehicle, such as the axle(s). For example, changes in vibrations may indicate a change in road surfaces. In another example, when two or more vibration sensors 642 are used, the differences between the vibrations may be used to determine friction or slippage of the road surface (e.g., when the difference in vibration is between a power-driven axle and a freely rotating axle).

The vehicle 600 may include an ADAS system 638. The ADAS system 638 may include a SoC, in some examples. The ADAS system 638 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 660, LIDAR sensor(s) 664, and/or a camera(s). The ACC systems may include longitudinal ACC and/or lateral ACC. Longitudinal ACC monitors and controls the distance to the vehicle immediately ahead of the vehicle 600 and automatically adjust the vehicle speed to maintain a safe distance from vehicles ahead. Lateral ACC performs distance keeping, and advises the vehicle 600 to change lanes when necessary. Lateral ACC is related to other ADAS applications such as LCA and CWS.

CACC uses information from other vehicles that may be received via the network interface 624 and/or the wireless antenna(s) 626 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 600), while the I2V communication concept provides information about traffic further ahead. CACC systems may include either or both I2V and V2V information sources. Given the information of the vehicles ahead of the vehicle 600, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 660, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 660, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 600 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 600 if the vehicle 600 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 660, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 600 is backing up. Some RCTW systems include AEB to ensure that the vehicle brakes are applied to avoid a crash. RCTW systems may use one or more rear-facing RADAR sensor(s) 660, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 600, the vehicle 600 itself must, in the case of conflicting results, decide whether to heed the result from a primary computer or a secondary computer (e.g., a first controller 636 or a second controller 636). For example, in some embodiments, the ADAS system 638 may be a backup and/or secondary computer for providing perception information to a backup computer rationality module. The backup computer rationality monitor may run a redundant diverse software on hardware components to detect faults in perception and dynamic driving tasks. Outputs from the ADAS system 638 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 604.

In other examples, ADAS system 638 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 638 may be fed into the primary computer's perception block and/or the primary computer's dynamic driving task block. For example, if the ADAS system 638 indicates a forward crash warning due to an object immediately ahead, the perception block may use this information when identifying objects. In other examples, the secondary computer may have its own neural network which is trained and thus reduces the risk of false positives, as described herein.

The vehicle 600 may further include the infotainment SoC 630 (e.g., an in-vehicle infotainment system (IVI)). Although illustrated and described as a SoC, the infotainment system may not be a SoC, and may include two or more discrete components. The infotainment SoC 630 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 600. For example, the infotainment SoC 630 may radios, disk players, navigation systems, video players, USB and Bluetooth connectivity, carputers, in-car entertainment, Wi-Fi, steering wheel audio controls, hands free voice control, a heads-up display (HUD), an HMI display 634, a telematics device, a control panel (e.g., for controlling and/or interacting with various components, features, and/or systems), and/or other components. The infotainment SoC 630 may further be used to provide information (e.g., visual and/or audible) to a user(s) of the vehicle, such as information from the ADAS system 638, autonomous driving information such as planned vehicle maneuvers, trajectories, surrounding environment information (e.g., intersection information, vehicle information, road information, etc.), and/or other information.

The infotainment SoC 630 may include GPU functionality. The infotainment SoC 630 may communicate over the bus 602 (e.g., CAN bus, Ethernet, etc.) with other devices, systems, and/or components of the vehicle 600. In some examples, the infotainment SoC 630 may be coupled to a supervisory MCU such that the GPU of the infotainment system may perform some self-driving functions in the event that the primary controller(s) 636 (e.g., the primary and/or backup computers of the vehicle 600) fail. In such an example, the infotainment SoC 630 may put the vehicle 600 into a chauffeur to safe stop mode, as described herein.

The vehicle 600 may further include an instrument cluster 632 (e.g., a digital dash, an electronic instrument cluster, a digital instrument panel, etc.). The instrument cluster 632 may include a controller and/or supercomputer (e.g., a discrete controller or supercomputer). The instrument cluster 632 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 630 and the instrument cluster 632. In other words, the instrument cluster 632 may be included as part of the infotainment SoC 630, or vice versa.

FIG. 6D is a system diagram for communication between cloud-based server(s) and the example autonomous vehicle 600 of FIG. 6A, in accordance with some embodiments of the present disclosure. The system 676 may include server(s) 678, network(s) 690, and vehicles, including the vehicle 600. The server(s) 678 may include a plurality of GPUs 684(A)-684(H) (collectively referred to herein as GPUs 684), PCIe switches 682(A)-682(H) (collectively referred to herein as PCIe switches 682), and/or CPUs 680(A)-680(B) (collectively referred to herein as CPUs 680). The GPUs 684, the CPUs 680, and the PCIe switches may be interconnected with high-speed interconnects such as, for example and without limitation, NVLink interfaces 688 developed by NVIDIA and/or PCIe connections 686. In some examples, the GPUs 684 are connected via NVLink and/or NVSwitch SoC and the GPUs 684 and the PCIe switches 682 are connected via PCIe interconnects. Although eight GPUs 684, two CPUs 680, and two PCIe switches are illustrated, this is not intended to be limiting. Depending on the embodiment, each of the server(s) 678 may include any number of GPUs 684, CPUs 680, and/or PCIe switches. For example, the server(s) 678 may each include eight, sixteen, thirty-two, and/or more GPUs 684.

The server(s) 678 may receive, over the network(s) 690 and from the vehicles, image data representative of images showing unexpected or changed road conditions, such as recently commenced road-work. The server(s) 678 may transmit, over the network(s) 690 and to the vehicles, neural networks 692, updated neural networks 692, and/or map information 694, including information regarding traffic and road conditions. The updates to the map information 694 may include updates for the HD map 622, such as information regarding construction sites, potholes, detours, flooding, and/or other obstructions. In some examples, the neural networks 692, the updated neural networks 692, and/or the map information 694 may have resulted from new training and/or experiences represented in data received from any number of vehicles in the environment, and/or based on training performed at a datacenter (e.g., using the server(s) 678 and/or other servers).

The server(s) 678 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning).

Once the machine learning models are trained, the machine learning models may be used by the vehicles (e.g., transmitted to the vehicles over the network(s) 690, and/or the machine learning models may be used by the server(s) 678 to remotely monitor the vehicles.

In some examples, the server(s) 678 may receive data from the vehicles and apply the data to up-to-date real-time neural networks for real-time intelligent inferencing. The server(s) 678 may include deep-learning supercomputers and/or dedicated AI computers powered by GPU(s) 684, such as a DGX and DGX Station machines developed by NVIDIA. However, in some examples, the server(s) 678 may include deep learning infrastructure that use only CPU-powered datacenters.

The deep-learning infrastructure of the server(s) 678 may be capable of fast, real-time inferencing, and may use that capability to evaluate and verify the health of the processors, software, and/or associated hardware in the vehicle 600. For example, the deep-learning infrastructure may receive periodic updates from the vehicle 600, such as a sequence of images and/or objects that the vehicle 600 has located in that sequence of images (e.g., via computer vision and/or other machine learning object classification techniques). The deep-learning infrastructure may run its own neural network to identify the objects and compare them with the objects identified by the vehicle 600 and, if the results do not match and the infrastructure concludes that the AI in the vehicle 600 is malfunctioning, the server(s) 678 may transmit a signal to the vehicle 600 instructing a fail-safe computer of the vehicle 600 to assume control, notify the passengers, and complete a safe parking maneuver.

For inferencing, the server(s) 678 may include the GPU(s) 684 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 7:
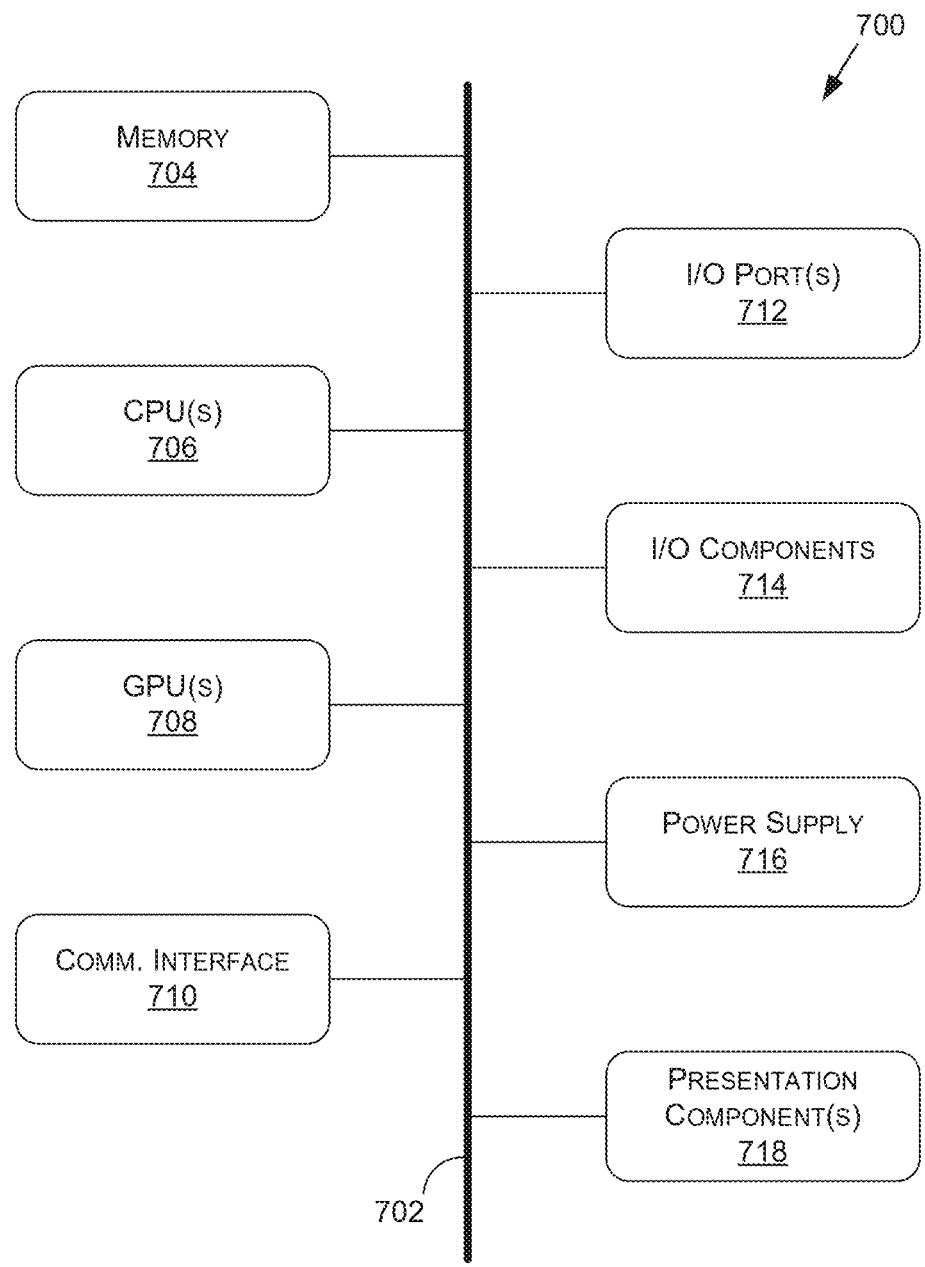
FIG. 7 is a block diagram of an example computing device suitable for use in implementing some embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 may generate pixel data for different portions of an output image or for different output images (e.g., a first GPU for a first image and a second GPU for a second image). Each GPU may include its own memory, or may share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    obtaining a first image representative of at least one past location of an actor within an environment;
    obtaining a second image representative of map information associated with the environment;
    computing, using one or more neural networks and based at least on image data representative of the first image and the second image, at least:
        first data corresponding to a first map representing at least a first portion of the environment, one or more first pixels of the first map indicating at least a first future location in the environment at a first future time;
        second data corresponding to a second map representing at least a second portion of the environment, one or more second pixels of the second map indicating at least a second future location in the environment at a second future time; and
        third data corresponding to a vector field associated with the second map;
    determining that the second future location indicated by the second map is associated with the actor;
    determining that one or more vectors from the vector field correspond to the second future location, the one or more vectors indicating a pixel distance between the second map and the first map;
    determining, based at least on the one or more first pixels of the first map being associated with the pixel distance from the one or more second pixels of the second map, that the first future location indicated by the first map is associated with the second future location indicated by the second map; and
    determining, based at least on the first future location indicated by the first map being associated with the second future location indicated by the second map, that the first future location indicated by the first map is also associated with the actor.

2. The method of claim 1, wherein the obtaining the first image includes rasterizing the at least one past location and the obtaining the second image includes rasterizing the map information.

3. The method of claim 1, wherein the map information is oriented with respect to a location of a vehicle and an orientation of the vehicle.

4. The method of claim 1, wherein the first image is oriented with a location of a vehicle at its center, and the at least one past location of the actor is oriented within the first image with respect to the location of the vehicle.

5. The method of claim 1, wherein the first image and the second image, and the third image are rasterized in a top-down view.

6. The method of claim 1, wherein at least one point within the vector field corresponds to a motion vector representative of a past location of the actor at a time prior to at least one of the first future time or the second future time.

7. The method of claim 1, wherein at least one pixel of the one or more second pixels of the second map corresponds to a confidence that the at least one pixel corresponds to the second future location associated with the actor.

8. The method of claim 1, wherein the one or more neural networks include a recurrent neural network (RNN), and further wherein:
    the RNN includes at least a first encoder-decoder architecture that receives, as input, the one or more past locations of the actor; and
    the RNN includes a second encoder-decoder architecture that receives, as input, one or more predicted future locations of the actor as output from the first encoder-decoder architecture of a third encoder-decoder architecture of the RNN.

9. The method of claim 1, wherein:
    the first data and the second data are computed using a first stream of layers of the one or more neural networks; and
    the third data is computed using a second stream of layers of the one or more neural networks different from the first stream of layers.

10. The method of claim 1, wherein the one or more neural networks are trained to compute the first data and the second data using a first loss function and to compute the third data using a second loss function different from the first loss function.

11. The method of claim 1, wherein:
a loss function used to train the one or more neural networks factors in a weight for an individual instance of training data based at least on a relevance of the individual instance; and
the relevance is determined based at least on at least one of:
a standard deviation of velocities of at least one actor in the individual instance of the training data;
a ratio of standard deviation in longitudinal directions and lateral directions of at least one actor in the individual instance of the training data; or
a change in standard deviation of velocities of at least one actor in the individual instance of the training data.

12. The method of claim 1, wherein the second future location is determined using clustering, the clustering including:
determining a number of pixels from the one or more second pixels of the second map above a threshold confidence value;
determining a centroid of the number of pixels; and
using the centroid to determine the second future location.

13. The method of claim 1, wherein:
the first map further indicates a third future location;
the second map further indicates a fourth future location associated with a second actor; and
the method further comprises determining, based at least on the first map, the second map, and the vector field, at least the third future location for the second actor at the first future time.

14. The method of claim 1, wherein:
the first map does not indicate the second future location associated with the actor within the environment at the second future time; and
the second map does not indicate the first future location associated with the actor within the environment at the first future time.

15. The method of claim 1, wherein:
the second image represents the map information without information indicating the at least one past location of the actor within the environment; and
the first image represents the at least one past location of the actor within the environment without the map information.

16. The method of claim 1, wherein:
the first image is associated with a first past time;
the method further comprises generating a third image representative of at least one second past location of the actor within the environment;
the third image is associated with a second past time;
the first future time associated with the first map is associated with the first past time associated with the first image; and
the second future time associated with the second map is associated with the second past time associated with the third image.

17. The method of claim 1, further comprising determining, based at least on the first map, the second map, and the vector field, a future trajectory associated with the actor, the future trajectory being associated with at least the first future location and the second future location.

18. The method of claim 1, wherein the first image and the second image are associated with at least one of a past time or a current time.

19. A processor comprising:
one or more processors to:
compute, using one or more neural networks:
first data associated with a first map representing at least a first portion of an environment, the first map including one or more first pixels indicating a first future location, the first map being associated with a first future time;
second data associated with a second map representing at least a second portion of the environment, the second map including one or more second pixels indicating a second future location, the second map being associated with a second future time that is after the first future time; and
third data representative of a vector field associated with the second map;
determine the second future location indicated by the second map is associated with an actor;
determine one or more vectors from the vector field corresponding to the second future location, the one or more vectors indicating a pixel distance between the second map and the first map;
determine based at least on the one or more first pixels from the first map being associated with the pixel distance from the one or more second pixels from the second map, that the second future location associated with the second future time is related to the first future location associated with the first future time that precedes the second future time; and
determine based at least on the second future location being related to the first future location, that the first future location indicated by the first map is also associated with the actor.

20. The processor of claim 19, wherein the computation of the first data is using a first head of the one or more networks and the computation of the second data is using a second head of the one or more neural networks.

21. The processor of claim 19, wherein the computation is based at least on map information and one or more prior locations associated with the actor, the map information and the one or more prior locations being oriented from a top-down perspective and with respect to a location of an ego-vehicle prior to being applied to the one or more neural networks.

22. The processor of claim 19, wherein the one or more neural networks are an encoder-decoder recurrent neural network (RNN).

23. The processor of claim 19, wherein the one or more processors are further to determine the first future location based at least on one or more of:
performing clustering on one or more values corresponding to one or more first pixels from the first map that correspond to the first future location; or
determining a weighted average of the one or more values corresponding to the one or more first pixels.

24. The processor of claim 19, wherein the computation of the first data and second data is based at least on fourth data representative of map information and fifth data representative of one or more prior locations of the actor being applied to the one or more neural networks, the fourth data and the fifth data applied to the one or more neural networks as image data.

25. The processor claim 24, wherein the computation of the first data and the second data is further based at least on sixth data representative of state information of the actor being applied to the one or more neural networks.

26. The processor of claim 19, wherein the one or more processors are further to generate a predicted future trajectory for the actor based at least on the first future location and the second future location.

27. A system comprising:
one or more processor to:
obtain a first image representative of map information and a second image representative of one or more prior locations of an actor;
compute, using one or more neural networks and based at least on the first image and the second image:
a first map representing an environment, the first map corresponding to a first future time and including one or more first pixels indicating a first future location associated with an actor;
a second map representing the environment, the second map corresponding to a second future time after the first future time and including one or more second pixels indicating a second future location associated with the actor; and
a vector field corresponding to the second future time, the vector field indicating a pixel distance between the one or more second pixels of the second map and the one or more first pixels of the first map such that the vector field predicts the first future location of the actor at the first future time using the second future location of the actor at the second future time.

28. The system of claim 27, wherein the one or more processors are further to:
obtain a third image representative of one or more locations of one or more objects that are associated with one or more wait conditions within the environment,
wherein the computation is further based at least on the third image.

29. The system of claim 27, wherein the vector field specifies the pixel distance as at least a first number of pixels in a first direction and a second number of pixels in a second direction.

* * * * *